(12) United States Patent
Ye et al.

(10) Patent No.: US 12,212,399 B2
(45) Date of Patent: Jan. 28, 2025

(54) BEAM FAILURE RECOVERY TIMING IN A NONTERRESTRIAL NETWORK (NTN)

(71) Applicant: Apple Inc., Cupertino, CA (US)

(72) Inventors: Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Seyed Ali Akbar Fakoorian, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/774,508

(22) PCT Filed: May 8, 2021

(86) PCT No.: PCT/CN2021/092437
§ 371 (c)(1),
(2) Date: May 5, 2022

(87) PCT Pub. No.: WO2022/236490
PCT Pub. Date: Nov. 17, 2022

(65) Prior Publication Data
US 2024/0162976 A1    May 16, 2024

(51) Int. Cl.
*H04B 7/185* (2006.01)

(52) U.S. Cl.
CPC .............................. *H04B 7/18513* (2013.01)

(58) Field of Classification Search
CPC .................................................. H04B 7/18513
See application file for complete search history.

(56) References Cited

U.S. PATENT DOCUMENTS

| 2019/0222289 A1 | 7/2019 | John Wilson et al. |
| 2019/0245737 A1* | 8/2019 | Zhou ........................ H04B 7/06 |
| 2019/0274169 A1* | 9/2019 | Tsai .................... H04W 56/0045 |

(Continued)

FOREIGN PATENT DOCUMENTS

CN       110798900 A      2/2020

OTHER PUBLICATIONS

PCT Search Report dated Jan. 14, 2022 in connection with PCT Application No. PCT/CN2021/092437.

(Continued)

*Primary Examiner* — Erika A Washington
(74) *Attorney, Agent, or Firm* — Eschweiler & Potashnik, LLC; Jacob Ballantyne

(57) ABSTRACT

A user equipment (UE), a base station (e.g., next generation NodeB (gNB)), or other network component can operate to configure a beam failure recovery (BFR) timing based on a time offset and a number of symbols in a BFR procedure, as well as enable beam switching and bandwidth part (BWP) switching to be correlated. A beam failure recovery request (BFRQ) can be processed or transmitted in response to a detection of a beam failure. A beam failure recovery response (BFRR) can be generated via a physical downlink control channel (PDCCH) based on at least four slots after the BFRQ and a time offset for a non-terrestrial network (NTN).

30 Claims, 14 Drawing Sheets

(56) References Cited

U.S. PATENT DOCUMENTS

2021/0067234 A1    3/2021  Guan et al.
2021/0153193 A1*   5/2021  Lin .................... H04W 56/0065
2021/0377825 A1*  12/2021  Deenoo ............... H04W 36/322

OTHER PUBLICATIONS

PCT Written Opinion dated Jan. 25, 2022 in connection with PCT Application No. PCT/CN2021/092437.
Huawei et al. Beam failure recovery for SCell 3GPP TSG RAN WG1 Meeting #96bis R1-1903977 Apr. 12, 2019.
Qualcomm Incorporated Measurement requirements in NTN Systems 3GPP TSG-RAN WG4 Meeting # 98-bis-e R4-2107292 Apr. 20, 2021.
Panasonic QCL elated issues during BWP switching 3GPP TSG-RAN WG1 Meeting #93 R1-1806390 May 25, 2018.
International Preliminary Report On Patentability dated Nov. 14, 2023 in connection with PCT Application No. PCT/CN2021/092437.

* cited by examiner

```
TCI-state ::= SEQUENCE {
    tci-StateId         TCI-StateId;
    qcl-Type1           QCL-Info,
    qcl-Type2           QCL-Info...)
QCL-Info ::= SEQUENCE {
    cell                ServCellIndex
    bwp-Id              BWP-Id
    referenceSignal     CHOICE {
        csi-rs              NZP-CSI-RS-ResourceId,
        ssb                 SSB-Index},
    qcl-Type            ENUMERATED {typeA, typeB, typeC, typeD}
    ass-DL-BWP          BWP-Id
    ass-UL-BWP          BWP-Id
    ass-polarization    ENUMERATED {linear, RHCP, LHCP}
...}
```

*FIG. 10*

BEAM FAILURE RECOVERY TIMING IN A NONTERRESTRIAL NETWORK (NTN)

This application is a National Phase entry application of International Patent Application No. PCT/CN2021/092437 filed May 8, 2021, entitled "BEAM FAILURE RECOVERY TIMING IN A NON-TERRESTRIAL NETWORK (NTN)", the contents of which are herein incorporated by reference in their entirety.

FIELD

The present disclosure related to wireless technology, and more specifically, pertains to techniques for beam failure recovery timing in a non-terrestrial network (NTN).

BACKGROUND

As the number of mobile devices within wireless networks, and the demand for mobile data traffic, continue to increase, changes are made to system requirements and architectures to better address current and anticipated demands. For example, some wireless communication networks (e.g., fifth generation (5G) or new radio (NR) networks) may be developed to include non-terrestrial networks (NTN) comprising one or more satellites. In such scenarios, the satellites may operate as transparent network nodes linking user equipment (UEs) with a ground-based portions of the network, such as base stations and core network (CN).

BRIEF DESCRIPTION OF THE DRAWINGS

FIG. 10 illustrates an example transmission configuration indication (TCI) configuration for beam switching and BWP switching in NTN operations, in connection with aspects discussed herein.

DETAILED DESCRIPTION

Figure 1:
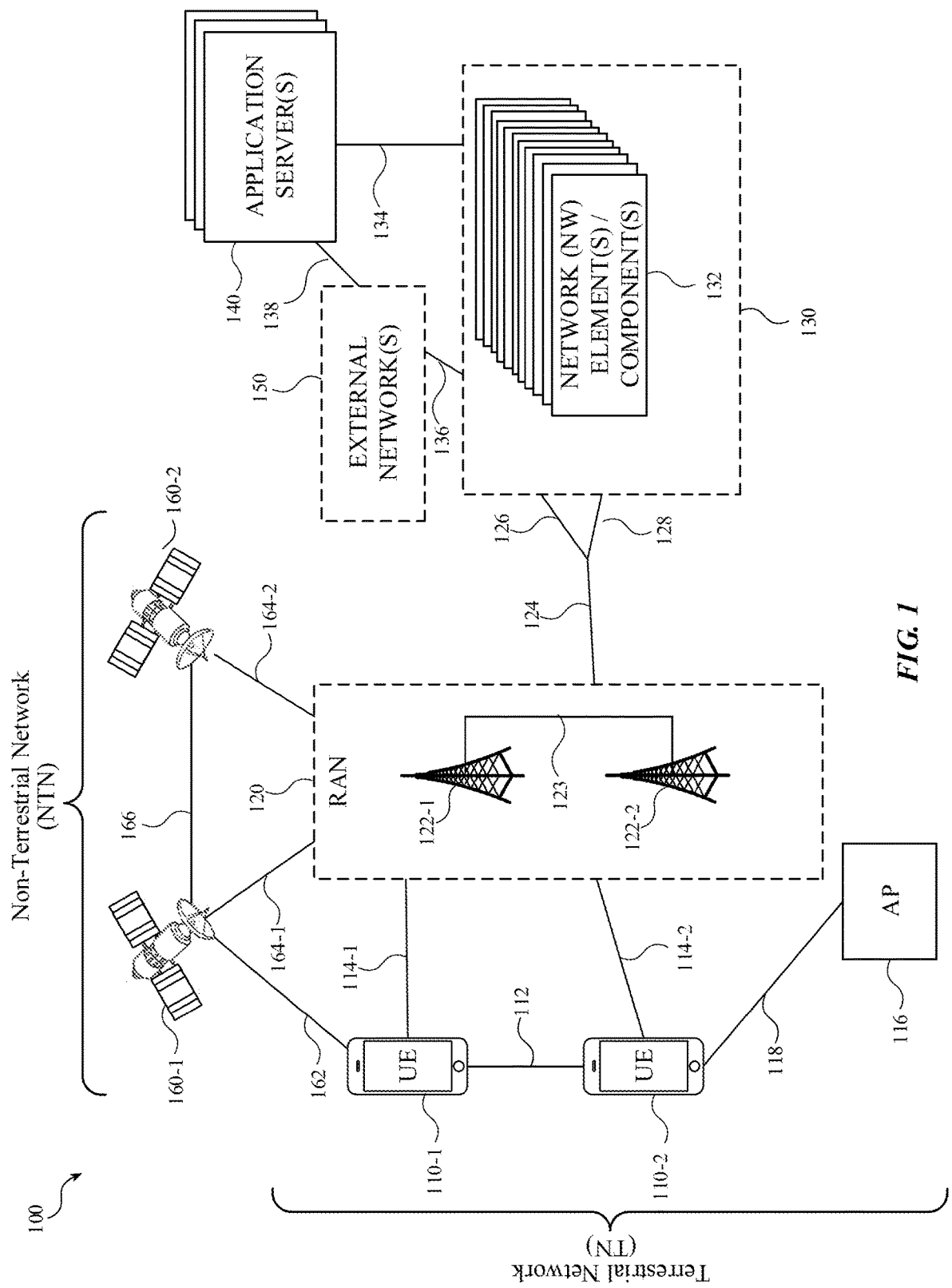
FIG. 1 is a block diagram illustrating an architecture of a system including a Core Network (CN), for example a Fifth Generation (5G) CN (5GC), in accordance with various aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like (or similarly ending) reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), or firmware. For example, a component can be a processor (e.g., a microprocessor, a controller, or other processing device), a process running on a processor, a controller, an object, an executable, a program, a storage device, a computer, a tablet PC or a user equipment (e.g., mobile phone, etc.) with a processing device. By way of illustration, an application running on a server and the server can also be a component. One or more components can reside within a process, and a component can be localized on one computer or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local or remote processes such as in accordance with a signal having one or more data packets (e.g., data from one component interacting with another component in a local system, distributed system, or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

In consideration of the above, various aspects/embodiments are disclosed for communications in non-terrestrial network (NTN) devices (e.g., user equipment (UE), evolved NodeB (eNB), a next generation NodeB (gNB), a new radio (NR) base station (BS), satellite base station or other network component). NTN communications can operate with a larger propagation delay compared to terrestrial networks (TNs). This longer propagation delay can cause inefficiencies in signaling, as well as wasted power loss. Therefore, to account for such longer delays in NTNs various aspects are described to align the time and scheduling between a base station and UE. For example, a time offset can be configured according to various aspects to introduce a larger timing advance used in NTN on top of what may already be defined for some 3GPP scenarios such as a four slot advance for monitoring a beam failure recovery response (BFRR) or a twenty-eight symbol advance for receiving/transmitting an uplink (UL) transmission (e.g., a physical uplink control channel (PUCCH), or physical uplink shared channel (PUSCH)) after the BFRR. Thus, NTN communications can be enhanced with respect to the BFRR timing.

Additionally, or alternatively, NTN communications can be enhanced in beam failure recovery response monitoring window startingtime, as well as the beam failure recovery activation timing, a CORESET #0 beam updating time and the random access response (RAR) window starting time. Further to improving efficiency in NTN communications and enhance beam management, bandwidth part (BWP) switching and beam switching operations can be associated according to further aspects.

In an aspect, a user equipment (UE) via processing circuitry or a processor can transmit a BFRQ in response to a detection of a beam failure or increased interference. A BFRR can be received via a physical downlink control channel (PDCCH) in response to the BFRQ based on at least four slots after the BFRQ and an additional time offset. The time offset can be a function of a K offset, a K mac, or both. The K offset can comprise a UE specific offset, a beam specific offset, or a cell specific offset based on whether a timing reference point is located at a base station of a non-terrestrial network (NTN) in a primary cell (PCell) or a primary secondary cell group cell (PSCell). The K mac can correspond to a medium access control (MAC) control element (MAC CE) activation time for a downlink configuration.

In an aspect, beam switching can be based on beam configuration information provided by a configuration grant, a downlink control information (DCI), a media access control (MAC) control element (MAC CE), a higher layer signaling (e.g., radio resource control (RRC)) or the like. The beam configuration information can include a Quasi Co-Location (QCL) configuration information that comprises at least one of: an associated DL BWP, an associated UL BWP, or an associated polarization, which can enable the beam switching operations to be associated with or enable BWP switching based on the QCL information when a frequency reuse factor is greater than one.

Additional aspects and details of the disclosure are further described below with reference to figures.

Aspects described herein can be implemented into a system using any suitably configured hardware or software. Referring to FIG. 1, illustrated is an example network 100, according to various aspects discussed herein. Example network 100 can include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 can include a non-terrestrial network (NTN) comprising one or more satellites 160 (e.g., of a global navigation satellite system (GNSS)) in communication with UEs 110 and RAN 120.

The systems and devices of example network 100 can operate in accordance with one or more communication standards, such as 2nd generation (2G), 3rd generation (3G), 4th generation (4G) (e.g., long-term evolution (LTE)), 5th generation (5G) (e.g., new radio (NR)) communication standards of the 3rd generation partnership project (3GPP). Additionally, or alternatively, one or more of the systems and devices of network 100 can operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 can include smartphones (e.g., handheld touchscreen mobile computing devices connectable to one or more wireless communication networks). Additionally, or alternatively, UEs 110 can include other types of mobile or non-mobile computing devices capable of wireless communications, such as personal data assistants (PDAs), pagers, laptop computers, desktop computers, wireless handsets, etc. In some implementations, UEs 110 can include internet of things (IoT) devices (or IoT UEs) that can comprise a network access layer designed for low-power IoT applications utilizing short-lived UE connections. Additionally, or alternatively, an IoT UE can utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data can be a machine-initiated exchange, and an IoT network can include interconnecting IoT UEs (which can include uniquely identifiable embedded computing devices within an Internet infrastructure) with short-lived connections. In some scenarios, IoT UEs can execute background applications (e.g., keep-alive messages, status updates, etc.) to facilitate the connections of the IoT network.

UEs 110 can communicate and establish a connection with (e.g., be communicatively coupled) with RAN 120, which can involve one or more wireless channels 114-1 and 114-2, each of which can comprise a physical communications interface/layer. In some implementations, a UE can be configured with dual connectivity (DC) as a multi-radio access technology (multi-RAT) or multi-radio dual connectivity (MR-DC), where a multiple receive and transmit (Rx/Tx) capable UE can use resources provided by different network nodes (e.g., 122-1 and 122-2) that can be connected via non-ideal backhaul (e.g., where one network node provides NR access and the other network node provides either E-UTRA for LTE or NR access for 5G). In such a scenario, one network node can operate as a master node (MN) and the other as the secondary node (SN). The MN and SN can be connected via a network interface, and at least the MN can be connected to the CN 130. Additionally, at least one of the MN or the SN can be operated with shared spectrum channel access, and functions specified for UE 110 can be used for an integrated access and backhaul mobile termination (IAB-MT). Similar for UE 101, the IAB-MT can access the network using either one network node or using two different nodes with enhanced dual connectivity (EN-DC) architectures, new radio dual connectivity (NR-DC) architectures, or the like.

As shown, UE 110 can also, or alternatively, connect to access point (AP) 116 via interface 118, which can include an air interface enabling UE 110 to communicatively couple with AP 116. AP 116 can comprise a wireless local area network (WLAN), WLAN node, WLAN termination point, etc. The connection 1207 can comprise a local wireless connection, such as a connection consistent with any IEEE 702.11 protocol, and AP 116 can comprise a wireless fidelity (Wi-Fi®) router or other AP. While not explicitly depicted in FIG. 1, AP 116 can be connected to another network (e.g., the Internet) without connecting to RAN 120 or CN 130. In some scenarios, UE 110, RAN 120, and AP 116 can be configured to utilize LTE-WLAN aggregation (LWA) techniques or LTE WLAN radio level integration with IPsec tunnel (LWIP) techniques. LWA can involve UE 110 in RRC_CONNECTED being configured by RAN 120 to utilize radio resources of LTE and WLAN. LWIP can involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling can include encapsulating the entirety of original IP packets and adding a new packet header, thereby protecting the original header of the IP packets.

RAN 120 can include one or more RAN nodes 122-1 and 122-2 (referred to collectively as RAN nodes 122, and individually as RAN node 122) that enable the connections 114-1 and 114-2 to be established between UEs 110 and RAN 120. RAN nodes 122 can include network access points configured to provide radio baseband functions for data or voice connectivity between users and the network based on one or more of the communication technologies described herein (e.g., 2G, 3G, 4G, 5G, WiFi, etc.). As examples therefore, a RAN node can be an E-UTRAN Node B (e.g., an enhanced Node B, eNodeB, eNB, 4G base station, etc.), a next generation base station (e.g., a 5G base station, NR base station, next generation eNBs (gNB), etc.). As a gNB 120, the RAN 120 can comprise one or more Distributed Units/Components (DU(s)) and a Central Unit/Components (CU)) and communicatively couple to CN 130 as a 5GC via satellite 160. The DU(s) and CU can be separated out from one another geographically, for example, and a CU can control multiple DUs to enable one or more DUs to be placed closer to the UE 110 with connectivity to the CU as an S1 interface, for example, as a gNB on-board based station, in which at least a part of the gNB 120 as a system or device is located on the satellite 160. Instead of placing an entire gNB 120 on a satellite 160, in an aspect, an architecture can have a component of the gNB 120 (e.g., the DU) located on satellite 160. The components of the gNB therefore can be directly connected to the processing circuitry of the satellite 160, while being communicatively coupled to the CU at a ground level gNB part. In these instances, the satellite 160 can be configured for inter-satellite communicate with other satellites. Any one or more of the satellites/gNB 5GC architectures herein can be configured to various aspects/embodiments, in which the satellite 160 can communicate through gateways connected to the internet. Such architectures can enable 3GPP to further utilize communications via the internet back in a coordinated connection between both satellite 160 and core network 130.

RAN nodes 122 can include a roadside unit (RSU), a transmission reception point (TRxP or TRP), and one or more other types of ground stations (e.g., terrestrial access points). In some scenarios, RAN node 122 can be a dedicated physical device, such as a macrocell base station, or a low power (LP) base station for providing femtocells, picocells or other like having smaller coverage areas, smaller user capacity, or higher bandwidth compared to macrocells. As described below, in some implementations, satellites 160 can operate as base stations (e.g., RAN nodes 122) with respect to UEs 110. As such, references herein to a base station, RAN node 122, etc., can involve implementations where the base station, RAN node 122, etc., is a terrestrial network node and also to implementation where the base station, RAN node 122, etc., is a non-terrestrial network (NTN) node (e.g., satellite 160).

Some or all of RAN nodes 120 can be implemented as one or more software entities running on server computers as part of a virtual network, which can be referred to as a centralized RAN (CRAN) or a virtual baseband unit pool (vBBUP). In these implementations, the CRAN or vBBUP can implement a RAN function split, such as a packet data convergence protocol (PDCP) split wherein radio resource control (RRC) and PDCP layers can be operated by the CRAN/vBBUP and other Layer 2 (L2) protocol entities can be operated by individual RAN nodes 122; a media access control (MAC)/physical (PHY) layer split wherein RRC, PDCP, radio link control (RLC), and MAC layers can be operated by the CRAN/vBBUP and the PHY layer can be operated by individual RAN nodes 122, or a "lower PHY" split wherein RRC, PDCP, RLC, MAC layers and upper portions of the PHY layer can be operated by the CRAN/vBBUP and lower portions of the PHY layer can be operated by individual RAN nodes 122. This virtualized framework can allow freed-up processor cores of RAN nodes 122 to perform or execute other virtualized applications.

In some implementations, an individual RAN node 122 can represent individual gNB-distributed units (DUs) connected to a gNB-control unit (CU) via individual F1 interfaces. In such implementations, the gNB-DUs can include one or more remote radio heads or radio frequency (RF) front end modules (RFEMs), and the gNB-CU can be operated by a server (not shown) located in RAN 120 or by a server pool (e.g., a group of servers configured to share resources) in a similar manner as the CRAN/vBBUP. Additionally, or alternatively, one or more of RAN nodes 120 can be next generation eNBs (i.e., gNBs) that can provide evolved universal terrestrial radio access (E-UTRA) user plane and control plane protocol terminations toward UEs 110, and that can be connected to a 5G core network (5GC) 130 via an NG interface.

Any of the RAN nodes 122 can terminate an air interface protocol and can be the first point of contact for UEs 110. In some implementations, any of the RAN nodes 122 can fulfill various logical functions for the RAN 120 including, but not limited to, radio network controller (RNC) functions such as radio bearer management, uplink and downlink dynamic radio resource management and data packet scheduling, and mobility management. UEs 110 can be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations are not necessarily limited in this regard. The OFDM signals can comprise a plurality of orthogonal subcarriers.

In some implementations, a downlink resource grid can be used for downlink transmissions from any of the RAN nodes 122 to UEs 110, and uplink transmissions can utilize similar techniques. The grid can be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block can comprise a collection of resource elements (REs); in the frequency domain, this can represent the smallest quantity of resources that currently can be allocated. There are several different physical downlink channels that are conveyed using such resource blocks.

Further, RAN nodes 122 can be configured to wirelessly communicate with UEs 110, or one another, over a licensed medium (also referred to as the "licensed spectrum" or the "licensed band"), an unlicensed shared medium (also referred to as the "unlicensed spectrum" or the "unlicensed band"), or combination thereof. A licensed spectrum can include channels that operate in the frequency range of approximately 400 MHz to approximately 3.8 GHz, whereas the unlicensed spectrum can include the 5 GHz band. A licensed spectrum can correspond to channels or frequency bands selected, reserved, regulated, etc., for certain types of wireless activity (e.g., wireless telecommunication network activity), whereas an unlicensed spectrum can correspond to one or more frequency bands that are not restricted for certain types of wireless activity. Whether a particular frequency band corresponds to a licensed medium or an unlicensed medium can depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 can operate using licensed assisted access (LAA), eLAA, or feLAA mechanisms. In these implementations, UEs 110 and the RAN nodes 122 can perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol.

The LAA mechanisms can be built upon carrier aggregation (CA) technologies of LTE-Advanced systems. In CA, each aggregated carrier is referred to as a component carrier (CC). In some cases, individual CCs can have a different bandwidth than other CCs. In time division duplex (TDD) systems, the number of CCs as well as the bandwidths of each CC can be the same for DL and UL. CA also comprises individual serving cells to provide individual CCs. The coverage of the serving cells can differ, for example, because CCs on different frequency bands will experience different pathloss. A primary service cell or PCell can provide a primary component carrier (PCC) for both UL and DL, and can handle radio resource control (RRC) and non-access stratum (NAS) related activities. The other serving cells are referred to as SCells, and each SCell can provide an individual secondary component carrier (SCC) for both UL and DL. The SCCs can be added and removed as required, while changing the PCC can require UE 110 to undergo a handover. In LAA, eLAA, and feLAA, some or all of the SCells can operate in the unlicensed spectrum (referred to as "LAA SCells"), and the LAA SCells are assisted by a PCell operating in the licensed spectrum. When a UE is configured with more than one LAA SCell, the UE can receive UL grants on the configured LAA SCells indicating different PUSCH starting positions within a same subframe.

The PDSCH can carry user data and higher layer signaling to UEs 110. The physical downlink control channel (PDCCH) can carry information about the transport format and resource allocations related to the PDSCH channel, among other things. The PDCCH can also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) can be performed at any of the RAN nodes 122 based on channel quality information fed back from any of UEs 110. The downlink resource assignment information can be sent on the PDCCH used for (e.g., assigned to) each of UEs 110.

The PDCCH uses control channel elements (CCEs) to convey the control information, wherein a number of CCEs (e.g., 6 or the like) can include of a resource element groups (REGs), where a REG is defined as a physical resource block (PRB) in an OFDM symbol. Before being mapped to resource elements, the PDCCH complex-valued symbols can first be organized into quadruplets, which can then be permuted using a sub-block interleaver for rate matching, for example. Each PDCCH can be transmitted using one or more of these CCEs, where each CCE can correspond to nine sets of four physical resource elements known as REGs. Four quadrature phase shift keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, 8, or 16).

Some implementations can use concepts for resource allocation for control channel information that are an extension of the above-described concepts. For example, some implementations can utilize an extended (E)-PDCCH that uses PDSCH resources for control information transmission. The EPDCCH can be transmitted using one or more ECCEs. Similar to the above, each ECCE can correspond to nine sets of four physical resource elements known as an EREGs. An ECCE can have other numbers of EREGs in some situations.

The RAN nodes 122 can be configured to communicate with one another via interface 123. In implementations where the system 100 is an LTE system, interface 123 can be an X2 interface. The X2 interface can be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface can include an X2 user plane interface (X2-U) and an X2 control plane interface (X2-C). The X2-U can provide flow control mechanisms for user data packets transferred over the X2 interface and can be used to communicate information about the delivery of user data between eNBs or gNBs. For example, the X2-U can provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C can provide intra-LTE access mobility functionality (e.g., including context transfers from source to target eNBs, user plane transport control, etc.), load management functionality, and inter-cell interference coordination functionality.

As shown, RAN 120 can be connected (e.g., communicatively coupled) to CN 130. CN 130 can comprise a plurality of network elements 132, which are configured to offer various data and telecommunications services to customers/subscribers (e.g., users of UEs 110) who are connected to the CN 130 via the RAN 120. In some implementations, CN 130 can include an evolved packet core (EPC), a 5G CN, or one or more additional or alternative types of CNs. The components of the CN 130 can be implemented in one physical node or separate physical nodes including components to read and execute instructions from a machine-readable or computer-readable medium (e.g., a non-transitory machine-readable storage medium). In some implementations, network function virtualization (NFV) can be utilized to virtualize any or all the above-described network node roles or functions via executable instructions stored in one or more computer-readable storage mediums (described in further detail below). A logical instantiation of the CN 130 can be referred to as a network slice, and a logical instantiation of a portion of the CN 130 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

As shown, CN 130, application servers (ASs) 140, and external networks 150 can be connected to one another via interfaces 134, 136, and 138, which can include IP network interfaces. Application servers 140 can include one or more server devices or network elements (e.g., virtual network functions (VNFs) offering applications that use IP bearer resources with CM 130 (e.g., universal mobile telecommunications system packet services (UMTS PS) domain, LTE PS data services, etc.). Application server 140 can also, or alternatively, be configured to support one or more communication services (e.g., voice over IP (VoIP sessions, push-to-talk (PTT) sessions, group communication sessions, social networking services, etc.) for UEs 110 via the CN 130. Similarly, external networks 150 can include one or more of a variety of networks, including the Internet, thereby providing the mobile communication network and UEs 110 of the network access to a variety of additional services, information, interconnectivity, and other network features.

As shown, example network 100 can include an NTN that can comprise one or more satellites 160-1 and 160-2 (collectively, "satellites 160"). Satellites 160 can be in communication with UEs 110 via service link or wireless interface 162 or RAN 120 via feeder links or wireless interfaces 164 (depicted individually as 164-1 and 164). In some implementations, satellite 160 can operate as a passive or transparent network relay node regarding communications between UE 110 and the terrestrial network (e.g., RAN 120). In some implementations, satellite 160 can operate as an active or regenerative network node such that satellite 160 can operate as a base station to UEs 110 (e.g., as a gNB of RAN 120) regarding communications between UE 110 and RAN 120. In some implementations, satellites 160 can communicate with one another via a direct wireless interface (e.g., 166) or an indirect wireless interface (e.g., via RAN 120 using interfaces 164-1 and 164-2). Additionally, or alternatively, satellite 160 can include a GEO satellite, LEO satellite, or another type of satellite. Satellite 160 can also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 can operate as bases stations (e.g., RAN nodes 122) with respect to UEs 110. As such, references herein to a base station, RAN node 122, etc., can involve implementations where the base station, RAN node 122, etc., is a terrestrial network node and implementation, where the base station, RAN node 122, etc., is a non-terrestrial network node (e.g., satellite 160).

Core NW elements/components can include one or more of the following functions and network components: an Authentication Server Function (AUSF); an Access and Mobility Management Function (AMF); a Session Management Function (SMF); a Network Exposure Function (NEF); a Policy Control Function (PCF); a Network Repository Function (NRF); a Unified Data Management (UDM); an Application Function (AF); a User Plane (UP) Function (UPF); and a Network Slice Selection Function (NSSF).

The UPF can act as an anchor point for intra-RAT and inter-RAT mobility, an external Protocol Data Unit (PDU) session point of interconnect to Data Network (DN), and a branching point to support multi-homed PDU session. The UPF can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF can include an uplink classifier to support routing traffic flows to a data network. A DN can be various network operator services, Internet access, or third-party services, include, or be similar to, an application server. The UPF can interact with the SMF via an N4 reference point between the SMF and the UPF.

The AUSF can store data for authentication of UE 101 and handle authentication-related functionality. The AUSF can facilitate a common authentication framework for various access types. The AUSF can communicate with the AMF via an N12 reference point between the AMF and the AUSF; and can communicate with the UDM via an N13 reference point between the UDM and the AUSF. Additionally, the AUSF can exhibit an Nausf service-based interface.

The AMF can be responsible for registration management (e.g., for registering UE 110, etc.), connection management, reachability management, mobility management, and lawful interception of AMF-related events, and access authentication and authorization. The AMF can be a termination point for the N11 reference point between the AMF and the SMF. The AMF can provide transport for SM messages between the UE 110 and the SMF, and act as a transparent proxy for routing SM messages. AMF can also provide transport for SMS messages between UE 110 and a Short Message Service (SMS) Function (SMSF) (not shown in FIG. 1). AMF can act as Security Anchor Function (SEAF), which can include interaction with the AUSF and the UE 110 or receipt of an intermediate key that was established as a result of the UE 110 authentication process. Where Universal Subscriber Identity Module (USIM) based authentication is used, the AMF can retrieve the security material from the AUSF. AMF can also include a Single-Connection Mode (SCM) function, which receives a key from the SEA that it uses to derive access-network specific keys. Furthermore, AMF can be a termination point of a RAN Control Plane (CP) interface, which can include or be an N2 reference point between the (R)AN 120 and the AMF; and the AMF can be a termination point of Non Access Stratum (NAS) (N1) signaling, and perform NAS ciphering and integrity protection.

AMF can also support NAS signaling with a UE 110 over a non-3GPP (N3) Inter Working Function (IWF) interface. The N3IWF can be used to provide access to untrusted entities. N3IWF can be a termination point for the N2 interface between the (R)AN 120 and the AMF for the control plane, and can be a termination point for the N3 reference point between the (R)AN 120 and the UPF for the user plane. As such, the AMF can handle N2 signaling from the SMF and the AMF for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 110 and AMF via an N1 reference point between the UE 110 and the AMF, and relay uplink and downlink user-plane packets between the UE 110 and UPF. The N3IWF also provides mechanisms for IPsec tunnel establishment with the UE 110. The AMF can exhibit an Namf service-based interface, and can be a termination point for an N14 reference point between two AMFs 121 and an N17 reference point between the AMF and a 5G Equipment Identity Register (5G-EIR) (not shown in FIG. 1).

The UE 110 can be registered with the AMF in order to receive network services. Registration Management (RM) is used to register or deregister the UE 110 with the network (e.g., AMF), and establish a UE context in the network (e.g., AMF). The UE 110 can operate in an RM-REGISTERED state or an RM-DEREGISTERED state. In the RM-DEREGISTERED state, the UE 110 is not registered with the network, and the UE context in AMF holds no valid location or routing information for the UE 110 so the UE 110 is not reachable by the AMF. In the RM-REGISTERED state, the UE 110 is registered with the network, and the UE context in AMF can hold a valid location or routing information for the UE 110 so the UE 110 is reachable by the AMF. In the RM-REGISTERED state, the UE 110 can perform mobility Registration Update procedures, perform periodic Registration Update procedures triggered by expiration of the periodic update timer (e.g., to notify the network that the UE 110 is still active), and perform a Registration Update procedure to update UE capability information or to re-negotiate protocol parameters with the network, among others.

The AMF can store one or more RM contexts for the UE 110, where each RM context is associated with a specific access to the network. The RM context can be a data structure, database object, etc. that indicates or stores, inter alia, a registration state per access type and the periodic update timer. The AMF can also store a 5GC Mobility Management (MM) context that can be the same or similar to an (Enhanced Packet System (EPS))MM ((E)MM) context. In various embodiments, the AMF can store a Coverage Enhancement (CE) mode B Restriction parameter of the UE 110 in an associated MM context or RM context. The AMF can also derive the value, when needed, from the UE's usage setting parameter already stored in the UE context (or MM/RM context).

Connection Management (CM) can be used to establish and release a signaling connection between the UE 110 and the AMF over the N1 interface. The signaling connection is used to enable NAS signaling exchange between the UE 110 and the CN 130, and comprises both the signaling connection between the UE and the AN (e.g., RRC connection or UE-N3IWF connection for non-3GPP access) and the N2 connection for the UE 110 between the AN (e.g., RAN 110) and the AMF. The UE 110 can operate in one of two CM states, CM-IDLE mode or CM-CONNECTED mode. When the UE 110 is operating in the CM-IDLE state/mode, the UE 110 can have no NAS signaling connection established with the AMF over the N1 interface, and there can be (R)AN 120 signaling connection (e.g., N2 or N3 connections) for the UE 110. When the UE 110 is operating in the CM-CONNECTED state/mode, the UE 110 can have an established NAS signaling connection with the AMF over the N1 interface, and there can be a (R)AN 120 signaling connection (e.g., N2 or N3 connections) for the UE 110. Establishment of an N2 connection between the (R)AN 120 and the AMF can cause the UE 110 to transition from CM-IDLE mode to CM-CONNECTED mode, and the UE 110 can transition from the CM-CONNECTED mode to the CM-IDLE mode when N2 signaling between the (R)AN 120 and the AMF is released.

The SMF can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 110 and a data network DN identified by a Data Network Name (DNN). PDU sessions can be established upon UE 110 request, modified upon UE 110 and 5GC 120 request, and released upon UE 110 and 5GC 120 request using NAS SM signaling exchanged over the N1 reference point between the UE 110 and the SMF. Upon request from an application server, the 5GC 120 can trigger a specific application in the UE 110. In response to receipt of the trigger message, the UE 110 can pass the trigger message (or relevant parts/information of the trigger message) to one or more identified applications in the UE 110. The identified application(s) in the UE 110 can establish a PDU session to a specific DNN. The SMF can check whether the UE 110 requests are compliant with user subscription information associated with the UE 110. In this regard, the SMF can retrieve or request to receive update notifications on SMF level subscription data from the UDM 127.

The SMF can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs can be included in the system 100, which can be between another SMF in a visited network and the SMF in the home network in roaming scenarios. Additionally, the SMF can exhibit the Nsmf service-based interface.

Figure 2:
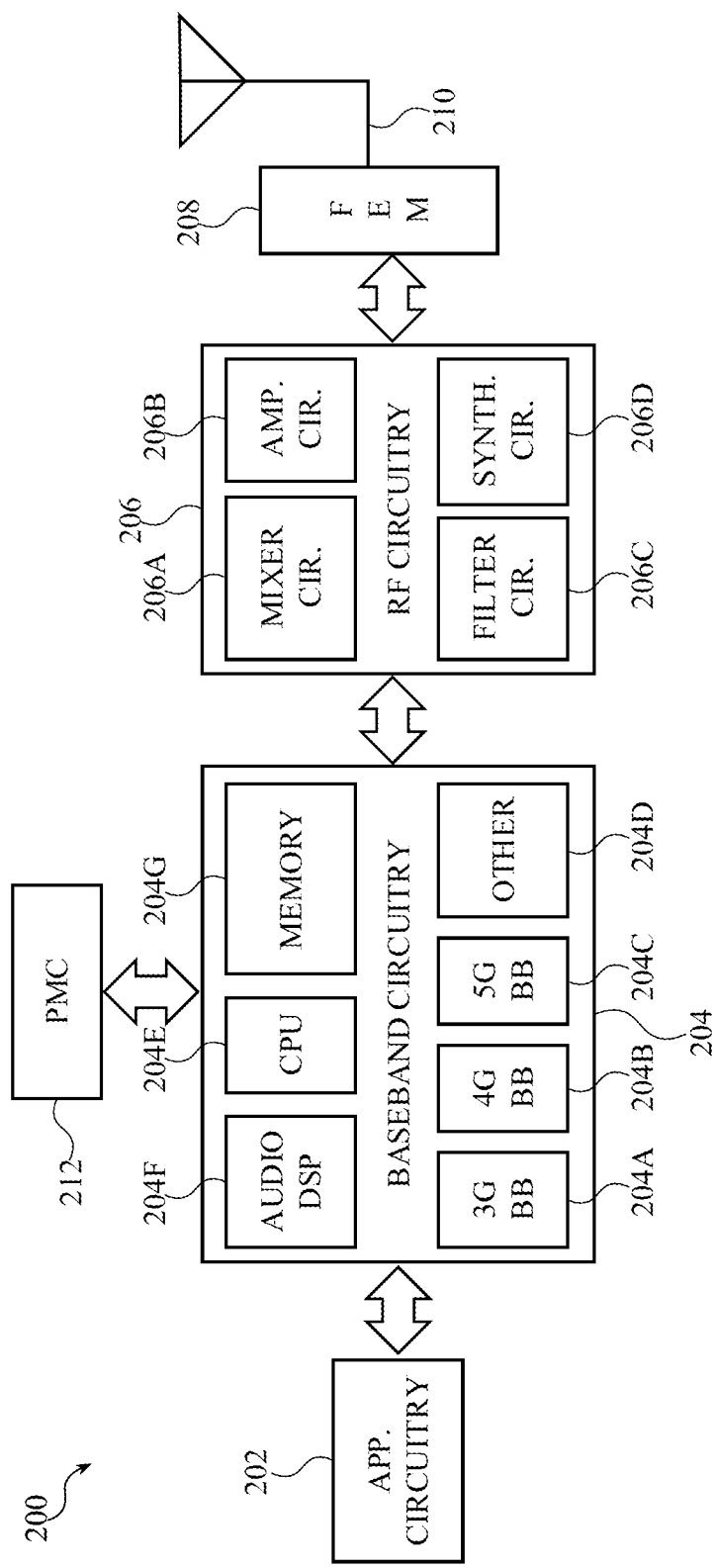
FIG. 2 is a diagram illustrating example components of a device that can be employed in accordance with aspects discussed herein.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some aspects, the device 200 can include fewer elements (e.g., a RAN node could not utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor (including one or more temperature sensors, such as a single temperature sensor, a plurality of temperature sensors at different locations in device 200, etc.), or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EU-TRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206d can be a fractional N/N+1 synthesizer.

In some aspects, frequency input can be provided by a voltage controlled oscillator (VCO), although that is not a requirement. Divider control input can be provided by either the baseband circuitry 204 or the applications processor 202 depending on the desired output frequency. In some aspects, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM 208, or in both the RF circuitry 206 and the FEM 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other aspects, the PMC 212 can be additionally or alternatively coupled with, and perform similar power management operations for, other components such as, but not limited to, application circuitry 202, RF circuitry 206, or FEM 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 could potentially not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
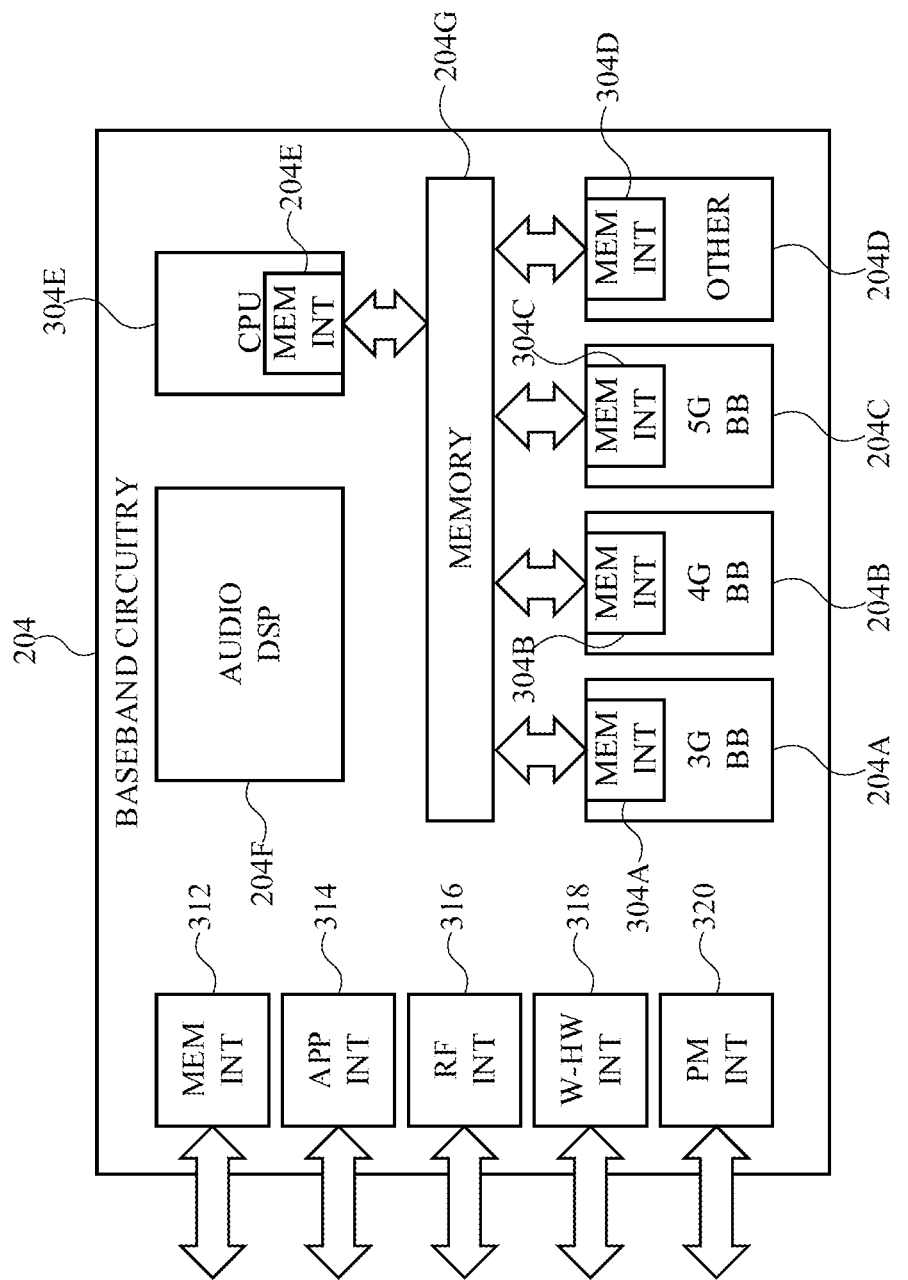
FIG. 3 is a diagram illustrating example interfaces of baseband circuitry that can be employed in accordance with aspects discussed herein.

FIG. 3 illustrates example interfaces of baseband circuitry in accordance with some aspects. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
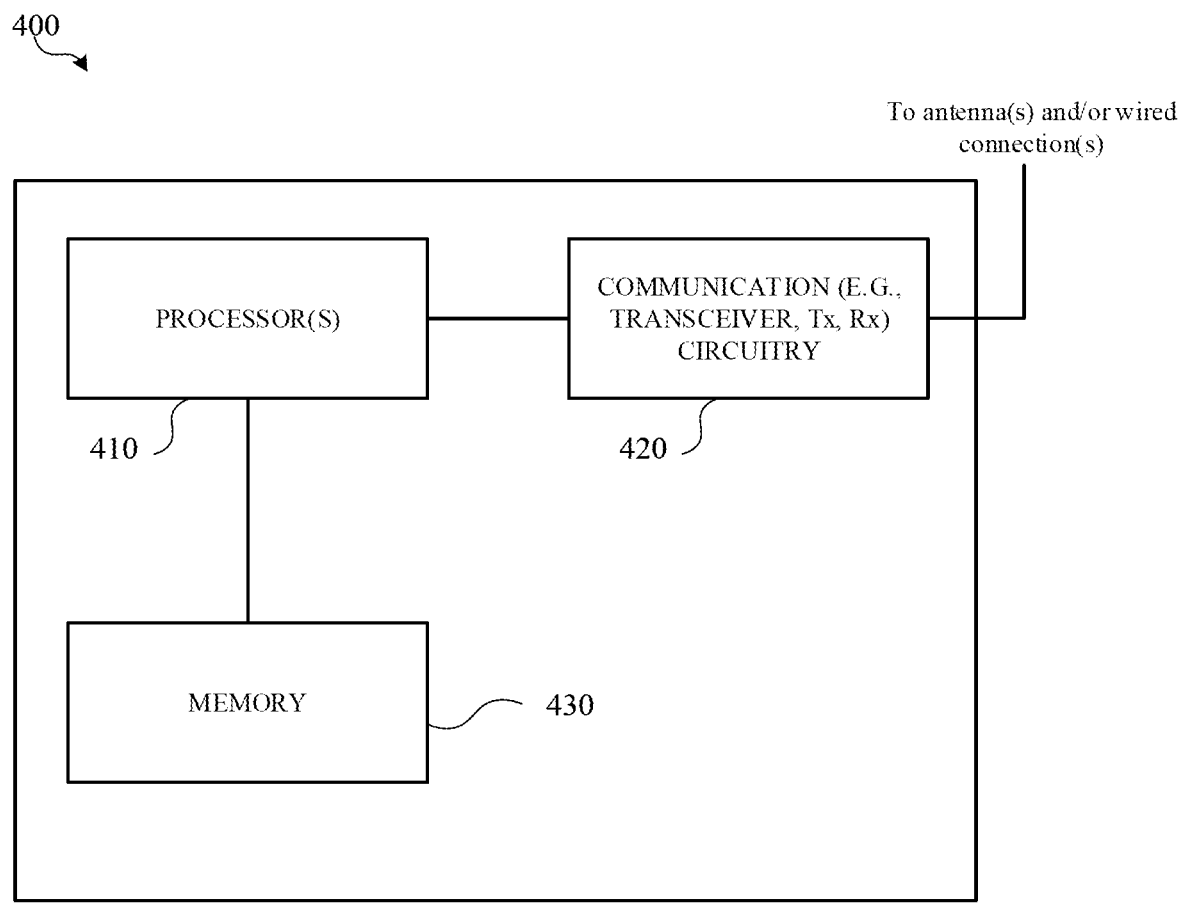
FIG. 4 is a block diagram illustrating a system that facilitates cell selection or reselection for a UE able to connect to one or more Non-Terrestrial Networks (NTNs), according to aspects discussed herein.

Referring to FIG. 4, illustrated is a block diagram of a system 400 employable at a UE 110, a Base Station (BS) (e.g., a next generation Node B (gNodeB or gNB), evolved Node B (eNB), NTN node 160, or other BS (base station)/TRP (Transmit/Receive Point)), an Access and Mobility Management Function (AMF) or another component of a 3GPP (Third Generation Partnership Project) network (e.g., a 5GC (Fifth Generation Core Network)) component or function such as a AMF (Access and Mobility Management Function)) that facilitates cell selection or reselection for a UE 110 able to connect to one or more Non-Terrestrial Networks (NTNs), according to various aspects discussed herein. System 400 can include processor(s) 410, communication circuitry 420, and memory 430. Processor(s) 410 (e.g., which can comprise one or more of 202 or 204A-204F, etc.) can comprise processing circuitry and associated interface(s) (e.g., a communication interface (e.g., RF circuitry interface 316) for communicating with communication circuitry 420, a memory interface (e.g., memory interface 312) for communicating with memory 430, etc.). Communication circuitry 420 can comprise, for example, circuitry for wired or wireless connection(s) (e.g., 206 or 208), which can include transmitter circuitry (e.g., associated with one or more transmit chains) or receiver circuitry (e.g., associated with one or more receive chains), wherein transmitter circuitry and receiver circuitry can employ common or distinct circuit elements, or a combination thereof). Memory 430 can comprise one or more memory devices (e.g., memory 204G, local memory (e.g., including CPU register(s)) of processor(s) discussed herein, etc.) which can be of any of a variety of storage mediums (e.g., volatile or non-volatile according to any of a variety of technologies/constructions, etc.), and can store instructions or data associated with one or more of processor(s) 410 or transceiver circuitry 420).

Specific types of aspects of system 400 (e.g., UE aspects, etc.) can be indicated via subscripts (e.g., system $400_{UE}$ comprising processor(s) $410_{UE}$, communication circuitry $420_{UE}$, and memory $430_{UE}$). In some aspects, such as BS aspects (e.g., system $400_{BS}$) and network component (e.g., AMF, etc.) aspects (e.g., system $400_{AMF}$) processor(s) $410_{BS}$ (etc.), communication circuitry (e.g., $420_{BS}$, etc.), and memory (e.g., $430_{BS}$, etc.) can be in a single device or can be included in different devices, such as part of a distributed architecture. In aspects, signaling or messaging between different aspects of system 400 (e.g., $400_1$ and $400_2$) can be generated by processor(s) $410_1$, transmitted by communication circuitry $420_1$ over a suitable interface or reference point (e.g., a 3GPP air interface, N1, N8, N11, N22, etc.), received by communication circuitry $420_2$, and processed by processor(s) $410_2$. Depending on the type of interface, additional components (e.g., antenna(s), network port(s), etc. associated with system(s) $400_1$ and $400_2$) can be involved in this communication.

In various aspects, one or more of information (e.g., system information, resources associated with signaling, etc.), features, parameters, etc. can be configured to a UE $400_{UE}$ via signaling (e.g., Access Stratum (AS) signaling, Non-Access Stratum (NAS)) originating from or routed through a Base Station (e.g., gNB, etc.) or other access point (e.g., via signaling generated by processor(s) $410_{BS}$, transmitted by communication circuitry $420_{BS}$, received by communication circuitry $420_{UE}$, and processed by processor(s) $410_{UE}$). Depending on the type of information, features, parameters, etc., the type of signaling employed or the exact details of the operations performed at the UE or BS in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

Various embodiments can employ a satellite that operates in a transparent mode, forwarding signaling between a UE (e.g., 110, 400) and a gNB (e.g., 120, 400), while in other aspects (embodiments), part or all of a gNB 120, 400 can be located at the satellite node 160. Compared to terrestrial networks, NTNs have a longer propagation delay, and thus, to improve efficiency of communication and align timings for power saving and accuracy, beam failure recovery (BFR) timing enhancements can be configured in the NTN. In particular, variously defined time offsets can be configured to accommodate for the longer propagation in NTNs. Applications can include, but not limited to, a K_offset (K offset) that can be applied to indicate a first transmission opportunity of a UL transmission (e.g., PUSCH in Configured Grant Type 2). Additionally, a K_offset can be applied to a transmission timing of DCI scheduled PUSCH. As satellite nodes or a UE moves, an update of the K_offset can be configured after initial access (e.g., a random access procedure, or the like). For unpaired spectrum, the value range of K1 can be extended from (0 . . . 15) to (0 . . . 31), which can impact the size of the physical downlink shared channel (PDSCH) to the hybrid automatic repeat request (HARQ) field (e.g., PDSCH-to-HARQ_feedback timing indicator field) in DCI. In an aspect, the time offset can be configured to comprise such a K offset to enhance the adjustment of uplink transmission timing upon the reception of a corresponding timing advance (TA) command, for example.

For the PCell or the PSCell, the UE 110 can be provided, by a physical random access channel (PRACH) dedicated resource for BFR (e.g., PRACH-ResourceDedicatedBFR), a configuration for PRACH transmission. For PRACH transmission in a slot n and according to antenna port quasi co-location (QCL) parameters associated with periodic channel state information (CSI) reference signal (CSI-RS) resource configuration or with synchronization signal (SS)/physical broadcast channel (PBCH) block associated with index q_new provided by higher layers, the UE monitors the physical downlink control channel (PDCCH) in a search space set provided by a recovery search space identification (ID) (e.g., recoverySearchSpaceId) for detection of a DCI format with cyclic redundancy check (CRC) scrambled by a cell (C) radio network temporary identifier (C-RNTI) or a modulation coding scheme (MCS) C-RNTI (MCS-C-RNTI) starting from the first slot after uplink slot n+4+Koffset+Kmac if Koffset, Kmac is provided, within a window configured by a BFR configuration information (or beam/BFR configuration information element) (e.g., BeamFailureRecoveryConfig). For PDCCH monitoring in a search space set provided by recoverySearchSpaceId and for corresponding PDSCH reception, the UE 110 assumes the same antenna port quasi-collocation parameters as the ones associated with index q_new until the UE 110 receives by higher layers an activation for a transmission configuration indicator (TCI) state or any of the parameters tci-StatesPDCCH-ToAddList and/or tci-StatesPDCCH-ToReleaseList. After the UE 110 detects a DCI format with CRC scrambled by C-RNTI or MCS-C-RNTI in the search space set provided by recoverySearchSpaceId, the UE 110 can continue to monitor PDCCH candidates in the search space set provided by recoverySearchSpaceId until the UE receives a media access control (MAC) control element (MAC CE) activation command for a TCI state or tci-StatesPDCCH-ToAddList and/or tci-StatesPDCCH-ToReleaseList.

In an aspect, beam failure recovery response timing can be configured via the UE 110, gNB 120 or other network component with a time offset that is defined by a slot n+4+Koffset+Kmac, if Koffset, Kmac is provided, and referenced/initiated from a slot that starts from a first slot after an UL transmission (e.g., a PRACH for BFR). For example, BFR where the beam recovery signaling occurs via a PCell or PSCell on an NTN as a PCell/PSCell BFR a time offset can be configured that comprises at least one of: a K offset or a K mac (e.g., K mac, K offset, or K offset+K mac), in addition to four or more transmission slots. In other words, the UE 110 can start to monitor the BFRR slot(s) at four slots plus the time offset after a BFRQ transmission via PRACH. Here, the time offset can be based on a round trip time (RTT) between the UE 110 and the gNB 120, for example. The K offset can be a UE specific offset or a beam specific offset after an initial access in the NTN. As a beam specific offset, the time offset corresponds to a current/old beam or another/new beam with a different beam index. The K mac can comprise another time offset different from the K offset, where the K mac can correspond to a medium access control (MAC) control element (MAC CE) activation time for a downlink (DL) configuration as a configured grant or information element of a transmission occasion.

In an aspect, the time offset can be configured based on whether a timing reference point is located at a base station of a non-terrestrial network (NTN) in a primary cell (PCell) or a primary secondary cell group cell (PSCell). For example, if a timing reference point of an RTT is designated at the gNB 120, then the time offset can comprise the K offset; if designated at another point other than the gNB, then the time offset can be derived as K offset plus K mac (K offset+K mac=time offset) or as the K mac. The K mac can be an additional time offset that is used for a MAC CE activation time for DL configuration. An RTT can be an amount of time that it takes for a signal to be sent plus acknowledgement that this signal has been received. This time can include propagation times for paths between different communication end points (e.g., the UE 110, gNB 120, and satellite node 160).

In an aspect, the time offset can be based on a minimum RTT of a cell and comprise a random access response (RAR) window offset (RAR_window_offset). Thus, the time offset can comprise four or more slots of a transmission and an offset that includes a duration, time, period value of the RAR window offset. Additionally, or alternatively, the time offset can be based on a maximum RTT of a cell, and thus the time offset can include the four or more slots plus the K offset, the K offset plus K mac (K offset+K mac), or the K mac depending on whether the time reference point of the RTT of the cell is at the gNB 120 or not. If it is at the gNB 120, the time offset can be the K offset with the four or more slots. Here, the K offset can be a cell specific or a beam specific offset, in which different cells of the NTN can comprise different K offset values that are derived based on the minimum or maximum RTT of any one or more UE/device component in the cell or different K offset values for different beams on the cell, for example.

Figure 5:
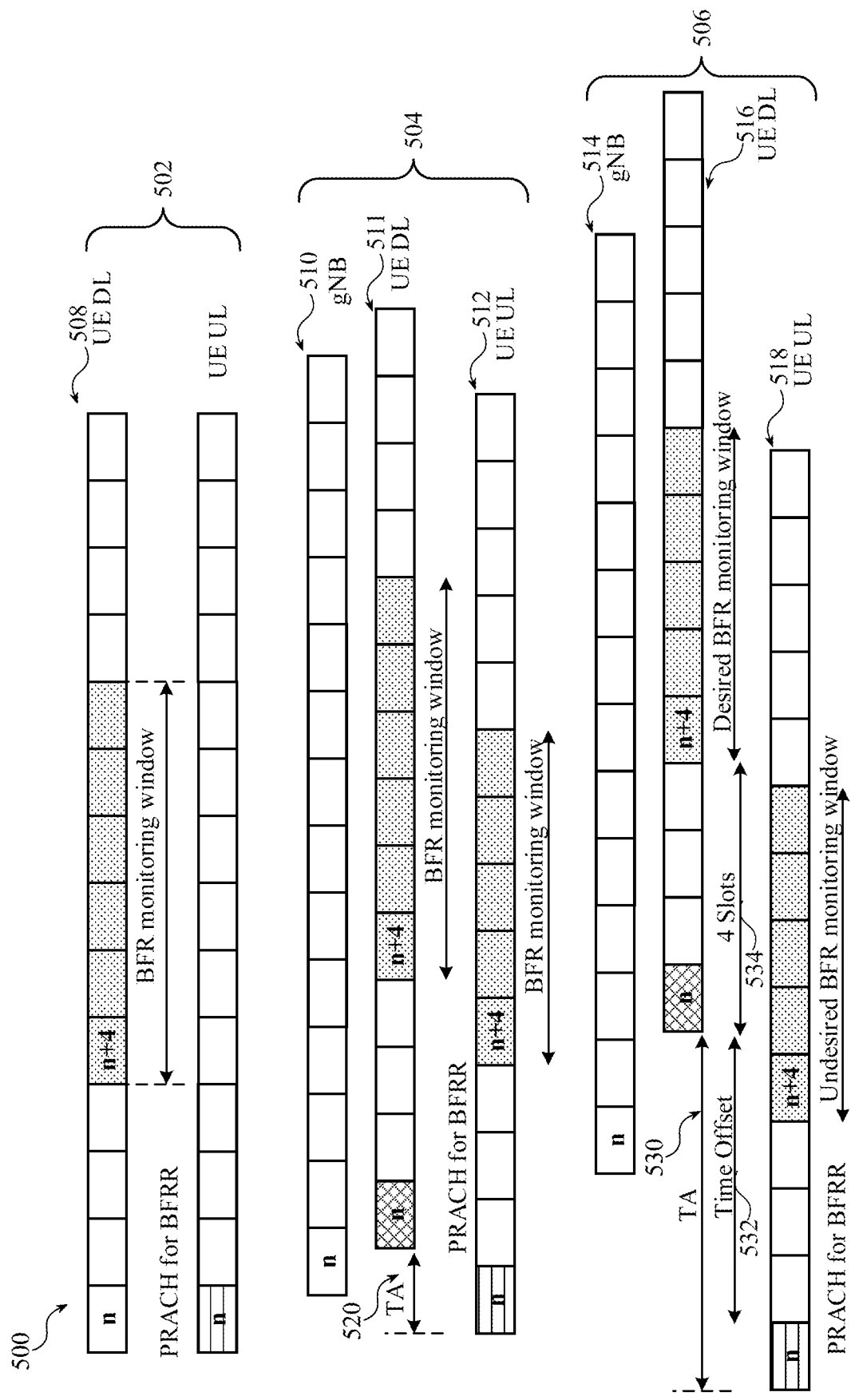
FIG. 5 illustrates a diagram showing different beam failure recovery (BFR) response timing for TN and NTN networks, in connection with aspects discussed herein.

Referring to FIG. 5, illustrated are example BFR signals and timings 500 for beam recovery in accord with various aspects herein. BFR signals and timings 500 includes three different sections or sets of signaling 502, 504, 506, for example. In NR TN, for example, beam failure recovery procedure signaling 502 can include the UE 110 transmitting in UL a beam failure recovery request (BFRQ) to gNB 120, in which this UE UL transmission can indicate a beam failure via a PRACH for a BFRR to provide a new beam index of a different beam than in previous use. In response, the gNB 120 provides a UE DL transmission (e.g., UL DL 508). The UE 110 utilizes a BFR monitoring window that initiates n+4 slots after a last UL slot at slot n of the BFRQ. The UE 110 receives beam failure recovery response (BFRR) from gNB 120 at the UE DL 508 and starts to monitor BFRR via PDCCH 4 slots after BFRQ transmission in NR TN. The gNB 120 transmits the data thru a transmit beam, and the UE 110 receives the data through a certain receiver beam. If there is a breakdown in reception, or acknowledgment, then the UE 110 transmits a BFRQ to request a beam switch to another a beam index with a beam that is determined to satisfy a threshold for the UE 110, for example. If UE 110 does not receive a BFRR within a time window to confirm that the UE 110 is receiving, then it re-sends the BFRQ or an updated BFRQ in the example signaling transmissions 502.

Signaling 502 can be BFR in an ideal case in a terrestrial network (TN). The first two sets of signaling 502 and 504 includes signaling BFR for TN with a short timing allowance 520 in non-ideal cases at section 504 because the distance between the UE 110 and gNB 120 is short in comparison to NTN. The first case includes signaling 502 as the ideal case where the UE 110 is near the base station or gNB 120 and the UE uplink and downlink timing are ideally aligned. At 502, after slot n the UE sends the BFRQ message through the PRACH transmission as a UE UL transmission of 202. Because the UL and DL timing are aligned, after four slots the UE 110 starts to monitor the beam failure recover monitoring window starting from n+4, as in the DL slot timing of UE DL 508.

At signaling 504, the UE 110 has a small time advance (TA) 520 in a TN between its DL timing transmission 511 and UL timing transmissions 512. Here, the DL timing signaling 511 is later and the UL timing 512 is earlier because once the UE 110 sends the UL timing signaling 512 at slot n it will reach the gNB 120 at slot n at 510; and once the gNB 120 send a transmission in slot n, it will reach the UE at DL time 511 at slot n. However, because the timing advance 520 is small for the UE UL 512 and DL 511 at signaling 504, the n+4 could start from the DL timing signaling 511 or the UL timing signaling 512. In both these cases, the difference is not big, but ideally the UE needs to choose/start monitoring the BFR at n+4 slots either starting from n+4 slots of the DL timing signaling 511 signaling or from the UL timing signaling 512 to have a chance to receive the BFRR message from the gNB 120 to the UE 110 as in the UE DL 511.

At NTN signaling 506, a larger TA 530 is utilized than the TA 520 in TN signaling 504, for example. Once the UE 110 sends a PRACH for a BFRQ at slot n of UE UL 518, the UE 110 can initiate monitoring for the BFRR in the "BFR monitoring window" in UL or DL. Here, if the UE 110 initiates the BFR monitoring window at only four slots based on the UL timing signaling 518, this would be too early because the UL message (e.g., BFRQ) has just reached the gNB 120 at slot n in the received signaling 514 because of the large propagation delay over NTNs. Thus, a time offset 532 can be configured in addition to four or more slots 534 to enable the "desired BFR monitoring window" instead of the "undesired beam failure recovery monitoring window". Such a time offset 532 can also be configured for initiating monitoring in the UL in UL 518, which is not shown here for explanation purposes, as in the UE DL 516 signaling with the "desired BFR monitoring window".

As discussed above, the time offset 532 can comprise a K offset, K mac, or both so that the UE begins to monitor for the BFRR at four or more slots plus the time offset. Depending on where a time reference point is at with respect to an RTT between a UE, gNB or satellite node, the K mac can be added to the K offset as an additional time offset, or used as the time offset alone. The K mac can be equal to time offset used for a MAC CE activation time for DL configuration.

In an aspect, different time offset alternatives can be configured dynamically or statically depending on an RTT between the UE 110 and gNB 120, each configured with four or more slots and a K offset, K mac or both K offset plus K mac. For example, if a timing reference point is at a gNB 120, the time offset 532 can be the K offset alone. The K offset in this aspect can be UE specific or beam specific, which is after initial access. If the K offset is beam specific than a new beam that is being switched to can correspond to a different K offset than an old or previous beam. Here, the K offset can comprise a time offset that is between the UE 110 and the timing reference point, and be derived from the RTT therebetween and broadcast, otherwise signaled to, or derived by the UE 110.

In another example, if the timing reference point is not at the gNB 120, the time offset can be the K offset plus a K mac timing, or the K mac only. The K mac is the time offset used for MAC CE activation time for DL configuration, and comprises the time between a timing reference point and the gNB 120 for an RTT. If the timing reference point is at the satellite or satellite node, then the additional K mac can be added to the K offset to configure an adequate timing offset because the UL message should reach the gNB before it has an effect. Alternatively, or additionally, for example, the time offset 532 can be the K mac alone where the K mac is used to cover all timing advance(s) between the UE and the timing reference point, and can also be derived from a timing reference point and the gNB 120.

In an aspect, the time offset 532 can be a K offset based on a minimal RTT time in response to the K offset being a cell specific K offset, rather than UE specific. Thus, all UEs within a cell of an NTN can be configured to utilize the time offset 532 as a K offset that is derived from the minimal RTT of the cell. The minimal RTT of the cell, for example, can be equal to a RAR window offset.

Additionally, or alternatively, the K offset can be beam specific and also be equal to the RAR window offset based on the minimal RTT of the cell for a particular beam, for example. When performing beam switching within the cell of the NTN, the time offset 532 could therefore vary depending on the new beam and be a different K offset than a previous beam utilized prior to BFR.

In an aspect, the time offset 532 can be based on a maximum RTT of a cell. The time offset 532 can likewise be at least four slots 534 and a K offset that is a cell specific offset used in the initial access and broadcast by the network when a timing reference point is at the gNB 120. Here, the K offset can alternatively or additionally be a beam specific offset and can correspond to the old beam or the new beam also. As described above, the time offset 532 can also be a K offset plus a K mac plus at least four slots 534, or a K mac alone plus the four slots 534. The K offset or K mac can be derived from a maximum RTT of the cell.

Figure 6:
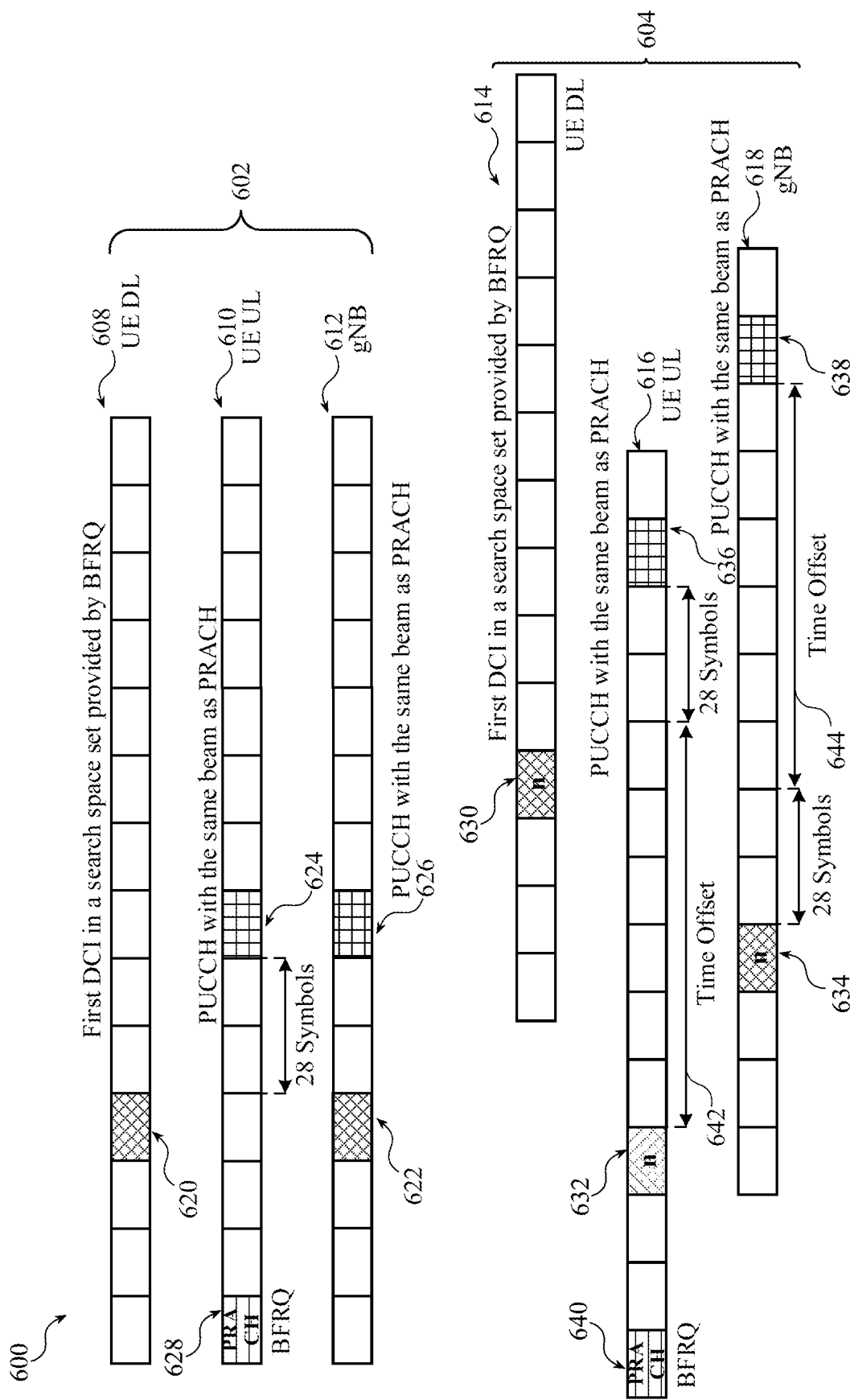
FIG. 6 illustrates a diagram showing different BFR timing offsets for terrestrial TN and NTN networks, in connection with aspects discussed herein.

Referring to FIG. 6, illustrated are example BFR signals and timings 600 for beam recovery activation time in accord with various aspects herein. Beam recovery activation time occurs after the UE 110 receives the beam failure recovery response (BFRR) 620 designated slot n (e.g., at 620 and 622 of signaling 602 for TN, and 630, 632, and 634 at signaling 604 for NTN) and as received in a first DCI in a search space provided by the BFRQ at UE DL 608. The beam recovery activation time is when the UE 110 starts to use or activates use of the new beam.

In an aspect, FIG. 6 illustrates aspects for PCell and the PSCell beam failure recovery activation timing. In the TN network, signaling at 602 illustrates where the UE 110 starts to transmit the UL transmission 610 using the new beam that is indicated by the PRACH with the BFRQ 628. After 28 symbols after receiving a first PDCCH with DCI indicated in a search space set indicated in the BFRR 620 in UE DL 608 or 622 at gNB 120 in signaling 612, the UE 110 activates the new beam indicated in the BFRQ at 624, which is aligned with the gNB 120 signaling 612 activation 626.

In NTN signaling 604, for PCell or PSCell beam failure recovery activation timing, the UE 110 starts to transmit a PUCCH using the beam failure recovery activation timing 636 in UE UL signaling 616. In UE UL signaling 616, the UE 110 starts to transmit a PUCCH using the same beam as indicated in PRACH transmission 640 for the BFRQ. The activation of this beam for transmitting the PUCCH occurs at 636 after 28 symbols and after receiving a first PDCCH in the search space set indicated in beam failure recovery request (BFRR) 632 (slot n), also seen at 630 in DL and 634 at the gNB.

In NTN, the gNB 120 at gNB signaling 618 receives the first PUCCH in the same beam as indicated by BFRQ at UL signaling 614 after transmitting the corresponding PDCCH in more symbols than after 28 symbols, including the BFR activation timing offset 644 as the time offset. Normally, the exact timing of receiving the first PUCCH by the UE 110 is unknown at the gNB 120.

From UE side signaling 616, UE 110 sends the BFRQ via PRACH 640 in UL and here the UE already received the BFRR, the response from the network at slot n 632. Then based on the current spec, the UE will start after 28 symbols after receiving the BFRR for its UL transmission, thereby activating the new or different beam indicated in the UE's BFRQ message via PRACH 640. Then from the gNB 120 at signaling 618, the gNB 120 does not necessarily know the propagation delay between the UE 110 and gNB 120 because it could be a larger variation depending on satellite locations, UE mobility, or the like, than in TN networks. Then the gNB 120 expects to use the new beam as receiver beam from the UL transmission 616 at an activation time 638 that is more than 28 symbols, but starting from what symbol to use the new beam, the gNB 120 does not necessarily know. In this aspect, the activation is at least the 28 symbols plus the time offset 644. The UE 110 also configures when to start to use the new transmission as a BFR activation time 636 and the gNB 120 when to use the new receiver beam in the BFR activation time 638 to receive the UL transmission from the UE.

For PCell or PSCell BFR activation timing, the UE 110 can configure a time offset 642 to determine the timing of the first PUCCH with the same beam as indicated in PRACH transmission 640. This time offset or BFR activation timing offset can be from the uplink slot n 632, where n is the first DCI reception in a search space set provided by BFRQ 640. The BFR activation time offset can be from the uplink slot n 632, starting from the same symbol index within a slot as the last symbol of the first DCI reception 630 with the BFRR. A gap of at least 28 symbols is added on top of that symbol also. The time offset for BFR activation is thus an additional time offset that is added on top of that symbol.

In an aspect, the BFR activation time offset (e.g., 642 or 644) can be configured as a K offset that comprises a UE specific offset or a beam specific offset, a K mac, or a function of both (K offset plus K mac) based on whether a timing reference point is located at a base station of a non-terrestrial network (NTN) in a PCell or a PSCell. As a beam specific offset, the time offset 642 or 644 can correspond to a current beam or new beam with a different beam index as indicated in the BFRQ. The K mac can be another time offset corresponding to a MAC CE activation time for a downlink configuration. The K offset and the K mac can be broadcast, or otherwise provided via the gNB, a higher layer signaling (e.g., RRC) or predefined for a given beam or UE.

If a timing reference point is at the gNB 120, then just the K offset can be configured for the BFR activation time offset 642, 644. Additionally, or alternatively, if the timing reference point is not at the gNB 120, but another time reference point in an RTT, the time offset can be the K offset+the K mac, or only the K mac.

Figure 7:
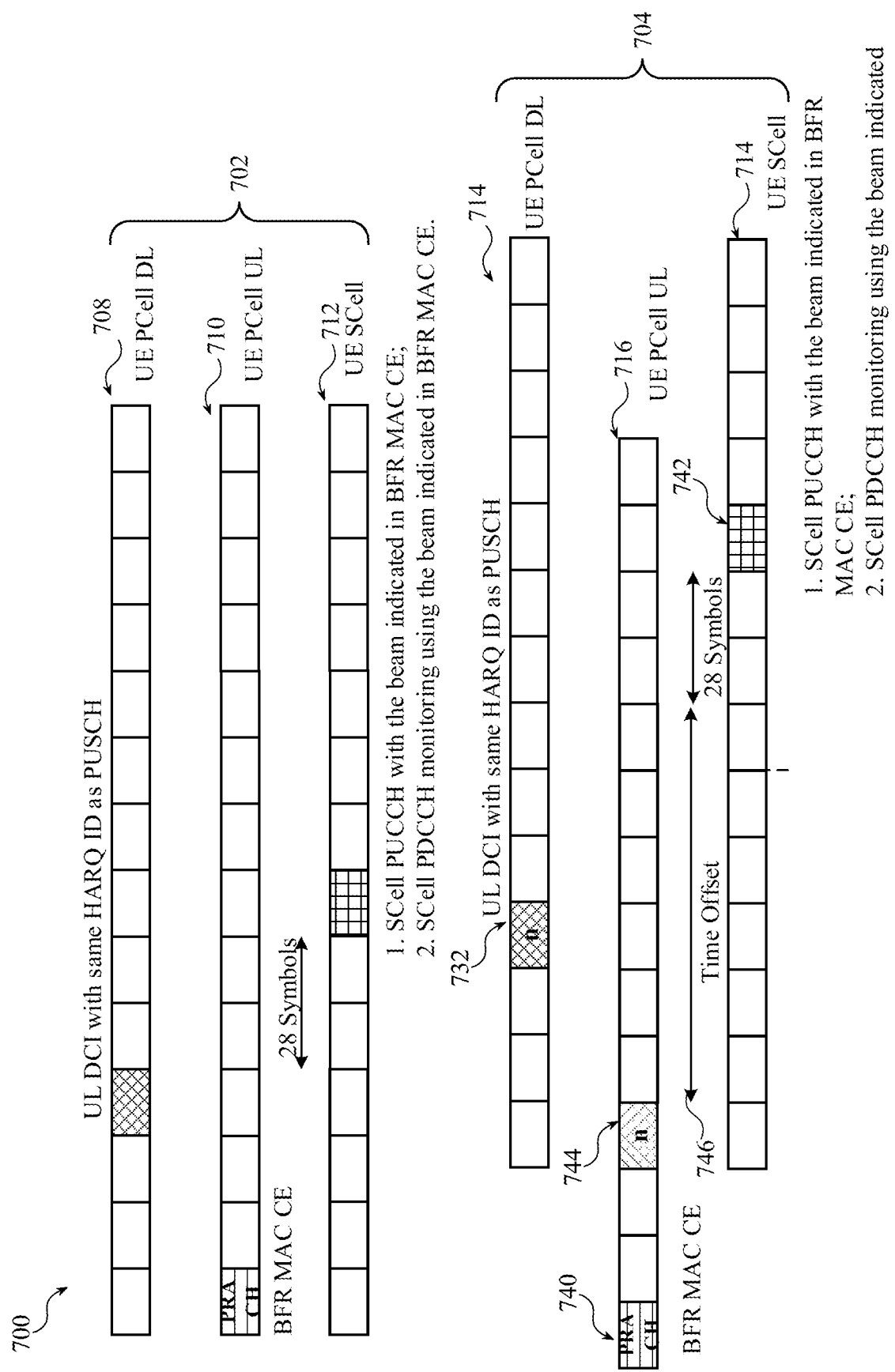
FIG. 7 illustrates a diagram showing different BFR activation timing for TN and NTN networks, in connection with the aspects discussed herein.

Referring to FIG. 7, illustrated are example BFR signals and timings 700 for beam recovery activation time in accord with various aspects herein related to SCell BFR. TN transmission are illustrated as a set of signaling 702, and NTN as a set of signaling 704.

In an aspect, the PCell could still be stable without utilizing BFR, but the SCell could have BFR. Instead of using a PRACH to transmit the BFRQ, the UE 110 can transmit the BFRQ using the MAC CE to indicate the BFR on the SCell at the UE PCell UL transmission 710. In this case, the PCell is still operable, and thus, the UE 110 uses the PCell to indicate this SCell failure. At the signaling 708 in UE PCell DL, the UE 110 receives the BFRR in PCell. Here, the UE receives a PDCCH with a DCI format scheduling the PUSCH transmission with a same HARQ process number as for the transmission of the first PUSCH and having a toggled new data indicator (NDI) field value. Then at signaling 712 for the UE SCell, the UE 110 activates in SCell to activate the UL transmission beam based on a 28 symbol gap between the BFR and activation of the new beam in the SCell. Thus, after 28 symbols from a last symbol of a PDCCH reception, the UE 110 monitors PDCCH in all control resource sets (CORESETs) on the SCell indicated by the MAC CE using the same beam. The UE 110 further transmits a PUCCH using the same spatial domain filter as the one indicated in the PUSCH MAC CE.

At the set of signaling 704 for NTN, the UE 110 transmits a first PUSCH carrying MAC CE for SCell BFRR 740 in the UE PCell UL signaling 716. The UE 110 receives a PDCCH in slot n 732 with a DCI format scheduling PUSCH transmission with the same HARQ process number as for the transmission of the first PUSCH and having a toggled NDI field value as in the UE PCell DL signaling 714. In the uplink slot n 744, starting from the same symbol index within a slot 732 as the last symbol of the PDCCH reception. A gap of 28 symbols is added on top of that symbol, in a time offset 746 is additionally added. After the additional time offset 746 is added on top of that symbol, the UE 110 monitors PDCCH in all CORESETs on the SCell indicated by the MAC CE using the same beam and transmits a PUCCH using the same spatial domain filter as the one indicated in PUSCH MAC CE at activation 742. The time offset 746 can be added to the at least 28 symbols for PUCCH only or for both PDCCH and PUCCH.

The SCell BFR activation time offset 746 can be configured as a K offset that comprises a UE specific offset or a beam specific offset, a K mac, or a function of both (K offset+K mac) based on whether a timing reference point is located at a base station of a non-terrestrial network (NTN) in an SCell. As a beam specific offset, the time offset 746 can correspond to a current beam or new beam with a different beam index as indicated in the BFRQ. The K mac can be another time offset corresponding to a MAC CE activation time for a downlink configuration. The K offset and the K mac can be broadcast, or otherwise provided via the gNB 120, a higher layer signaling (e.g., RRC) or predefined for a given beam or UE.

If a timing reference point is at the gNB 120, then just the K offset can be configured for the SCell BFR activation time offset 746. Additionally, or alternatively, if the timing reference point is not at the gNB 120, but another time reference point, the time offset can be the K offset+the K mac, or only the K mac.

In an aspect, updating the CORSET #0 beam is part of the BFR procedure can also be updated with a timing offset similarly as above (e.g., time offset 532, 642, 644, 746) with a CORSET #0 beam time offset. If the UE 110 is provided a zero value for the search space in the DL control signaling, then UE 110 determines monitoring for this PDCCH candidate in the CORSET #0. As such, the time offset as above (e.g., time offset 532, 642, 644, 746 with/without additional slots or symbols) can also similarly be configured to introduce a time offset to initiate or indicate when the CORSET #0 being active or when to receive a new beam for CORSET #0 in the CORSET #0 beam update.

For example, if the UE 110 is provided a zero value for searchSpaceID in PDCCH-ConfigCommon for a Type0/0A/2-PDCCH common search space (CSS) set, the UE 110 determines monitoring occasions for PDCCH candidates of the Type0/0A/2-PDCCH CSS set; the UE 110 is provided a C-RNTI. The UE monitors PDCCH candidates only at monitoring occasions associated with a SS/PBCH block, where the SS/PBCH block is determined by the most recent of: a MAC CE activation command indicating a TCI state of the active BWP that includes a CORESET with index 0, where the TCI-state includes a CSI-RS that is quasi-co-located with the SS/PBCH block; or a time offset after a random access procedure that is not initiated by a PDCCH order that triggers a contention-free random access procedure. The UE 110 should start to reset the CORESET #0 beam after transmitting the PRACH for random access procedure that is not initiated by a PDCCH ordered contention-free random access procedure. This CORSET #0 beam offset can be configured as a K offset that comprises a UE specific offset, a beam specific offset or a Cell specific offset. It can optionally comprise K mac, or be a function of both (K offset+K mac) based on whether a timing reference point is located at a base station of a non-terrestrial network (NTN). As a beam specific offset, the time offset for the CORESET #0 can correspond to a current beam or new beam with a different beam index as indicated in the BFRQ. The K mac can be another time offset corresponding to a MAC CE activation time for a downlink configuration. The K offset and the K mac can be broadcast, or otherwise provided via the gNB 120, a higher layer signaling (e.g., RRC) or predefined for a given beam or UE.

If a timing reference point is at the gNB 120, then just the K offset can be configured for a CORESET #0 time offset. Additionally, or alternatively, if the timing reference point is not at the gNB 120, but another time reference point, the time offset can be the K offset+the K mac, or only the K mac. The K offset can be based on a minimal or maximum RTT time in response to the K offset being a cell specific K offset, rather than UE specific. Thus, all UEs within a cell of an NTN can be configured to utilize the time offset as a K offset that is derived from the minimal or maximum RTT of the cell. The minimal or maximum RTT of the cell, for example, can be equal to a RAR window offset. Thus, the CORESET #0 can be the RAR window offset.

In an aspect, the time offset as discussed herein (e.g., time offset 532, 642, 644, 746 with/without additional slots or symbols) can be configured as a RAR window offset for a RAR response message 2 (Msg 2). A RAR window offset can be used in the initial access of the random access procedure. As a part of the BFR procedure, initially the gNB 120 may not have any connection. Thus, the UE 110 sends the PRACH to access the network, which can include the BFRQ comprising a beam index of a new beam. The network or gNB 120, for example, can respond by send back a random access response, a RAR message. However, the RAR message could reach the UE late in NTN due to the large propagation delay in NTN. Once the UE 110 sends the PRACH transmission it could wait to monitor the RAR message based on the RAR window offset similarly to the time offset discussed herein (e.g., time offset 532, 642, 644, 746 with/without additional slots or symbols), which can also be the RAR window offset. Additionally, after this offset the RAR window is utilized that can be about a 10 millisecond RAR window, for example. Thus, the RAR window offset can be up to a starting time of the RAR window. The UE 110 can be configured to receive PDCCH for Type1-PDCCH CSS set that is at least (a RAR window time offset) after the last symbol of the PRACH occasion corresponding to the PRACH transmission. The value of this time offset, as a RAR window time offset can be a timing advance (TA)+Kmac. The TA can be equal to the timing advance between the UE 110 and the timing reference point, which could be on the satellite 160, but could be anywhere between the satellite and the gNB 120. Here, the TA can be composed different components: (UE specific TA)+(common TA_b)+(common TA drifting rate_b)*delta t (∆t).

The UE specific TA component can be the TA between the UE and the satellite, measured by the UE 110 based on the UE 110 and the satellite's location, so is calculated by UE's global navigation satellite system (GNSS) location and a satellite ephemeris of satellite 160. The common TA_b can be broadcast by the network, which indicates the TA between the satellite 160 and the timing reference point that can be between the satellite 160 and the gNB 120. The common TA drifting rate_b can also be broadcast by network, which indicates the changing of this common TA. In NTN the satellite 160 can be moving and the TA between the satellite 160 and the gNB 120 could also be changing from time to time; this can be accounted for in the TA for the RAR window offset by this common TA drifting rate component based on these moving factors. The delta t (Δt) can be the time gap between the last (common TA drifting rate_b) reception or transmission time and the current time. As such, the TA could be based on or derived to account any one or all of these components or effects.

In various aspects, the value of the RAR window time offset or time offset can be a factor of the TA based on a UE Specific RTT between the UE 110 and gNB 120, or a maximum of an RTT between the UE and gNB. If the value of the time offset for the RAR window is a UE specific RTT between the UE 110 and gNB 120, then the time offset can be TA+Kmac, where the Kmac is a timing between the timing reference point and the gNB, and composed of two parts. For example, K mac=Kmac,b+(Kmac drifting rate_b) *delta t (Δt). The Kmac, b component can be broadcast by the network, which can be based on the current timing reference point to the gNB's timing offset, but because satellite 160 is moving in NTN the changing of this value can be monitored. Thus, the network can also broadcast this drifting rate to derive the final Kmac used in this value. The Kmac drifting rate_b can thus be broadcast by network and used to derive the Kmac. The delta t (Δt) can be the time gap between the last (Kmac drifting rate_b) reception or transmission time and the current time. So here, this is a UE specific RTT between UE and gNB and composed of TA and Kmac, and depends on the broadcast information as well as the drifting rate as not only a value, but also the variation rate of these values.

In another aspect, the RAR window time offset can depend on the maximum RTT between the UE and gNB and this TA is its own TA, but this K offset could be a common K offset in comparison or cell specific. The TA from above can thus be replaced by this K offset and this K offset can be common among all the UEs of a cell and used in this initial access for the RAR window time offset. Thus, the RAR window time offset can be K offset+Kmac, in which the K mac can be derived as discussed above based on K mac=Kmac,b+(Kmac drifting rate_b)*delta t (Δt).

Other aspects can be configured additionally, or alternatively, in relation to a Contention Resolution Timer (CRtimer). In a four-step RACH, for example, the UE 110 can initially send the PRACH and in a second step then the UE receives a RAR message, as discussed above. Then after getting the RAR message, the UE 110 can send a message Contention Resolution message 3 (Msg 3) and wait for message (Msg 4) in the contention resolution. Msg 3 is from UE 110 to network and Msg 4 is from network to the UE 110. After sending Msg 3, if the UE 110 doesn't receive Msg 3 after a certain time based on a contention resolution timer (CRtimer), then UE 110 considers the contention resolution failed, and restarts the random access procedure. The CRtimer can be a time initiated at Msg 3 in contention resolution that is a configured value between 8 and 64 ms.

In one embodiment, the CRtimer can be enhanced/enlarged by configuring an additional Contention Resolution timer time offset added to the CRtimer as a function of the TA and the K offset based on the UE specific RTT between the UE 110 and gNB 120. Similar to the above, the TA can be represented as follows: TA=(UE specific TA)+(common TA_b)+(common TA drifting rate_b)*delta t (Δt); and the K mac=Kmac, b+(Kmac drifting rate_b)*delta t (Δt).

Alternatively, or additionally, the CRtimer time offset can be dependent on a maximum RTT between the UE 110 and gNB 120, and be enlarged based on the K offset and Kmac as described above. Here, the K offset and K mac can be broadcast by the network, in which the K offset can be used in an initial access to the network via a beam for example.

In aspect, the K offset can be signaled, or a differential K offset signaled, which could be beam specific, cell specific or UE specific, as described herein. The K offset can also be provided to the UE 110 in RRC signaling, in a MAC CE, or DCI. Rather than providing an absolute the K offset, alternatively a differential K offset could be provided. A K offset can then be determined or updated by the UE 110 based on current K offset and the differential K offset value.

Figure 8:
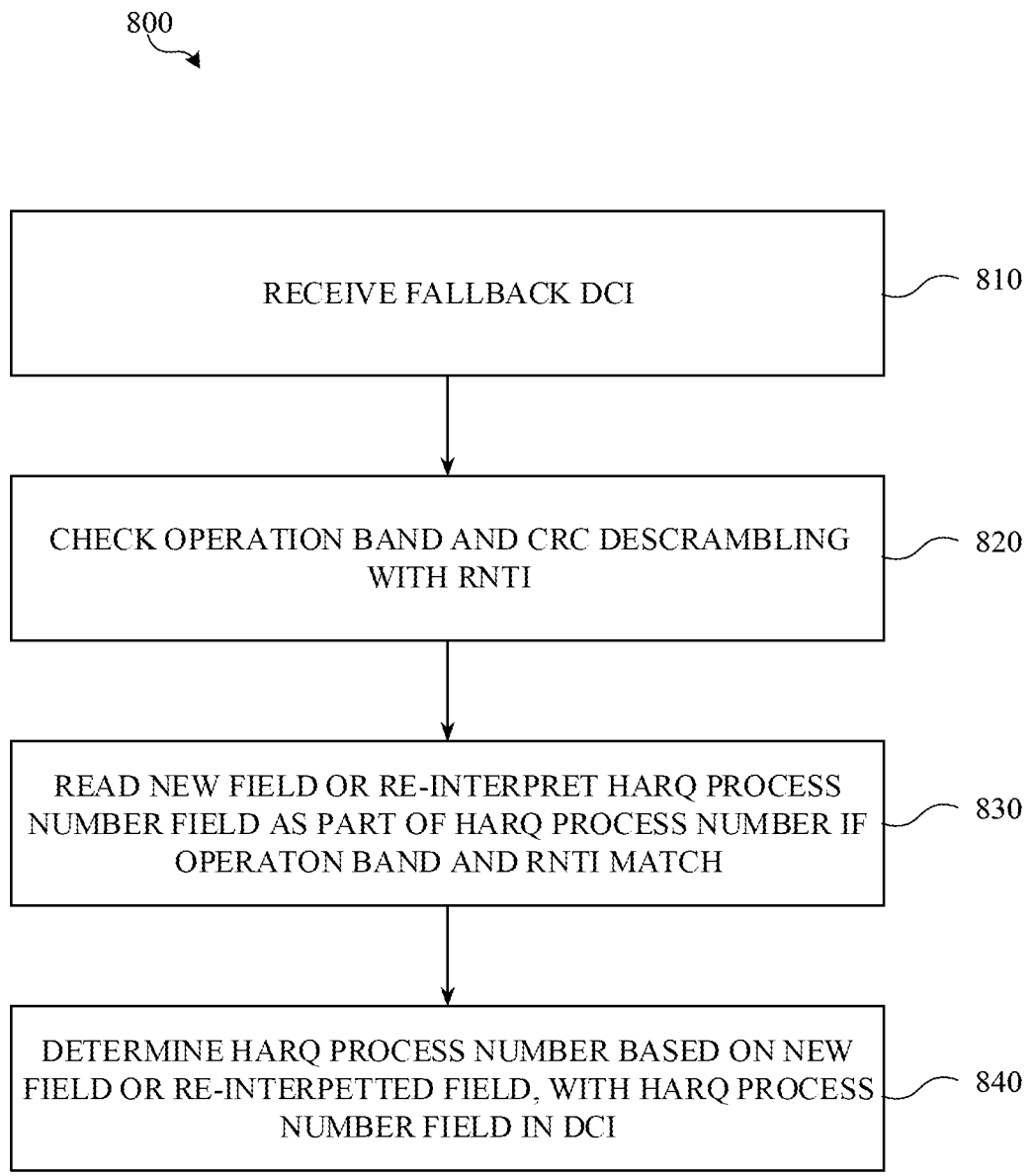
FIG. 8 illustrates an example process flow for determining HARQ process number in NTN, in connection with aspects discussed herein.

Referring to FIG. 8, illustrated is an example UE process flow 800 for determining a hybrid automatic repeat request (HARQ) process number in NTN in accord with aspects herein. The process flow 800 can initiate at 810 where a UE (e.g., UE 110) can receive a fallback DCI such as the DCI format 0_0 or 1_0 with CRC scrambled by a cell (C) radio network temporary identifier (RNTI) (C-RNTI), a configured scheduling (CS)-RNTI, a modulation coding scheme (MCS)-C-RNTI or a temporary cell (TC)-RNTI. At 820, process flow 800 further comprises the UE 110 checking the operation or operating band and descrambling the CRC with a certain RNTI. At 830, the process flow 800 continues with the UE 110 reading a new field or re-interpreting a field of a "HARQ process number", for example, as a part of a HARQ process number indicator, if the operation band and RNTI match.

In TN the maximum HARQ process number is 16 with only four bits allocated in the DCI to indicate up to 16 HARQ process numbers. However, in NTN the HARQ process number can be up to 32 HARQ process numbers. Thus, in order to indicate up to 32 HARQ process numbers, or more than 16, bits can be added such that 2 to the power of 5 can be at least 32. In an aspect, a new field can be added with the DCI format with a bit field of one bit, for example, that can be used to indicate the most significant bit (MSB) or least significant bit (LSB) of the HARQ process number. The bit field can serve to indicate the MSB or LSB of HARQ process number. The field could only be applicable in NTN band (e.g., Ka band or S band) or be applicable for certain use cases in order to not then extend the band, e.g., DCI format 0_0 or 1_0 with CRC scrambled by C-RNTI, CS-RNTI, MCS-C-RNTI or TC-RNTI. If the DCI is applicable to another type, then this avoids expanding this field (e.g., paging). For format 0_0 or 1_0 with CRC scrambled by P-RNTI, SI-RNTI, RARNTI or MsgB-RNTI or for operation in TN band, then no change would be configured. As such, if a new field is configured, it could be configured only to the NTN band and only used for UE specific DCI format.

The process flow 800 continues at 840 with determining a HARQ process number based on a new filed or re-interpreted field with a HARQ process number field in the DCI. Alternatively, or additionally, instead of adding a new filed used with existing four bit field to indicate 32, we can extend it directly for the HARQ process number field from 4 to 5 bit if the operating/operation band is in NTN band, as discussed above and for the fallback DCI such as the DCI format 0_0 or 1_0 with CRC scrambled by C-RNTI, CS-RNTI, MCS-C-RNTI or TC-RNTI. For format 0_0 or 1_0 with CRC scrambled by P-RNTI, SI-RNTI, RARNTI or MsgB-RNTI or for operation in TN band, then no change is necessarily configured.

Figure 9:
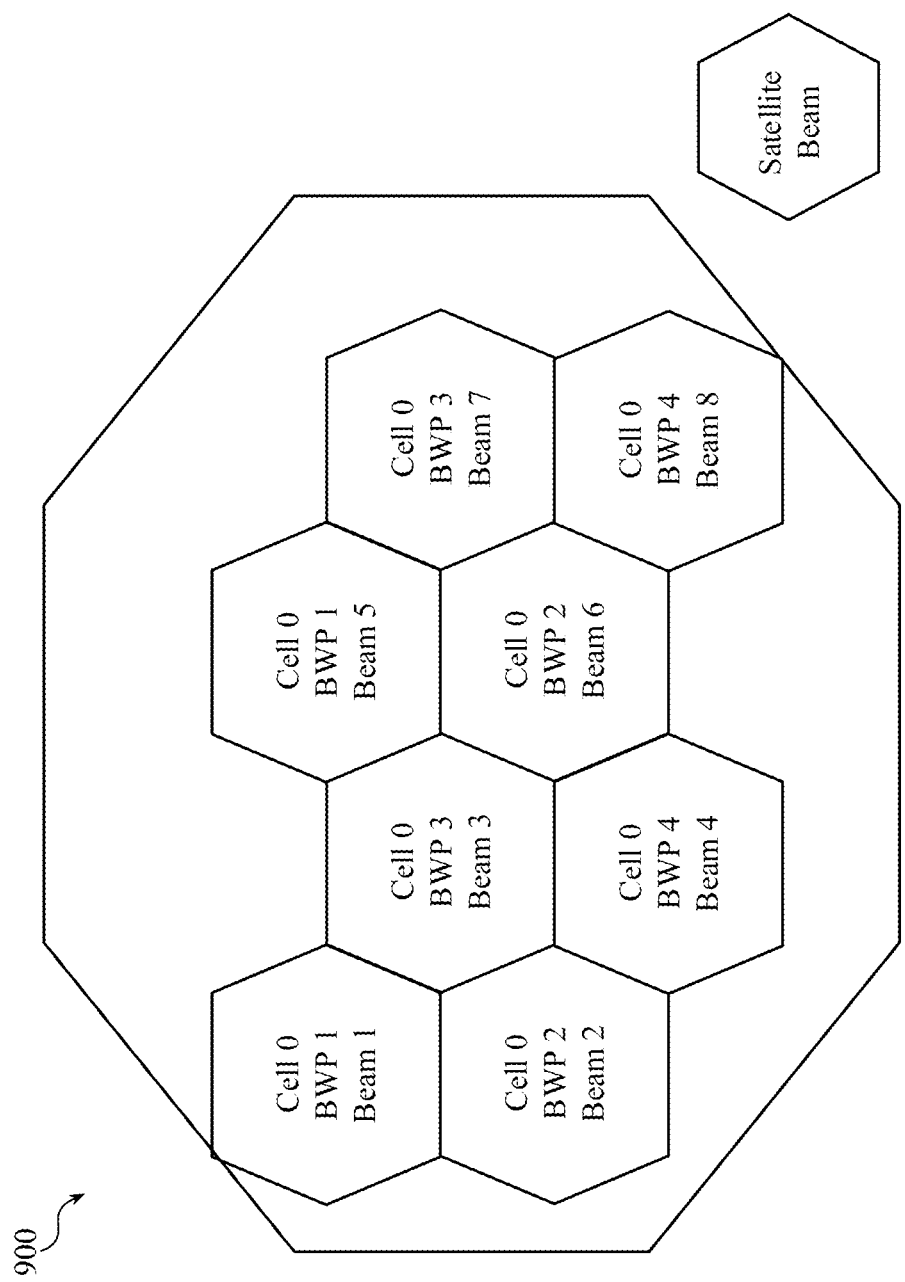
FIG. 9 illustrates an example multiple beam per cell with association of bandwidth part for a sample NTN coverage area, in connection with aspects discussed herein.

In other aspects, BWP switching schemes in NTN can be configured to further enhance efficient signaling with beam management and associations of synchronization signal blocks (SSBs), beams and bandwidth parts (BWPs). Referring to FIG. 9, illustrated is an example NTN cell 900 with multiple beams in a particular satellite coverage area on the satellite link. The cell 900 can include different beams across a cell coverage area on the surface of the earth with different beams having different areas such as Beam 1 thru 8 in the same cell: Cell 0. A neighbor beam could have different BWP so Beam 1 using BWP 1, beam 2 uses BWP 2 and so on. But the BWP can be reduced, for example, such that BWP 1 is used at Beam 1 and Beam 5, in order to be correlated somewhat in frequency, or the frequency domain part with beam frequency domain separation to avoid the intra beam interference because they comprise different neighbor beams, aiming to reduce the interference between the neighbor beam, which is what is referred to as the frequency reuse factor (FRF).

In various aspects, the FRF is larger than one so that if UE 110 switches from one beam to another beam uses a beam switching procedure and has moved from one area to another, for example. This can also include not just the beam switching, but also the BWP switching. In NTN, the beam switching can be associated with BWP switching. From a UE point of view, beam switching is achieved by the transmission configuration indication (TCI) state, which is associated with beam switching and communicated via a DCI or MAC CE in a TCI state configuration (including the cell and BWP of a reference signal, a reference signal index, or the QCL type with the reference signal). For example, DCI 1_1 contains a field of "Transmission configuration indication" to switch the PDSCH reception beam. A MAC CE of "Indication of TCI state for UE-specific PDCCH" or "Activation/deactivation of UE-specific PDSCH TCI state" can be used to switch PDCCH or PDSCH reception beam.

The BWP switching however can include a separate procedure, which can be achieved by DCI or a timer (e.g., a bwp-InactivityTimer). Each BWP configuration can include a frequency and a bandwidth. DCI 0_1 or 1_1 can include a field of "bandwidth part indicator" to switch UL or DL BWP among the configured list, respectively. A timer-based BWP switch is to switch to default BWP when the BWP inactivity timer expires. A Cell specific DL BWP can be configured by BWP-DownlinkCommon and a UE specific DL BWP can be configured by BWP-DownlinkDedicated. In TN networks, UE 110 does not need to do the beam switching, but directly has BWP switching. In other words, the BWP switching is a different signaling as the beam switching, but in NTN the two are associated.

In various aspects, BWP switching, or beam switching can occur when the UE 110 moves from one beam to another in the NTN. For frequency reuse factor (FRF) >1, each satellite beam is associated with a BWP. An objective of the various aspects or embodiments herein is to reduce the interference among different satellite beams, in which a satellite beam switch is associated with a BWP switch. From a UE's view, the TCI state may not be changed with a satellite beam switch since all satellite beams are from the same satellite and a QCL-type D (spatial Rx parameter) does not necessarily change with a satellite beam switch.

Referring to FIG. 10, illustrated is an example TCI state configuration 1000 that signals satellite beam switching in accord with various aspects. A TCI state configuration can include control or corresponding signaling control data that enables BWP switching along with the TCI state configuration for beam switching by the UE 110. In response to receiving a TCI configuration the UE 110 can generate beam switching from a first beam to a second beam based on configuration information associated with beam switching.

The configuration information or TCI state configuration can be processed as a part of configured grant, control element, information element, or other control data set for enabling beam switching. The TCI configuration 1000 can comprise a Quasi Co-Location (QCL) configuration information that comprises at least one of: an associated DL BWP (ass-DL-BWP with BWP-ID), an associated UL BWP (ass-UL-BWP with BWP-ID), or an associated polarization (ass-polarization with enumerated {linear polarization, right hand circular polarization (RHCP), or left hand circular polarization (LHCP)). The UE 110 can then modify a TCI state of the first beam or the second beam to be updated with the corresponding DL/UL BWP or the associated polarization. The UE 110 can then further generate a BWP switching based on the QCL configuration information of the TCI state configuration used in the beam switching when a frequency reuse factor is greater than one, for example.

Thus, implicit BWP switching can be triggered and enabled with satellite beam switching configuration data in the TCI state configuration. By receiving beam switching data to be used for beam switching operations, the UE 110 can be configured to perform the BWP switching autonomously without being triggered or further indicated BWP switching accordingly.

Figure 11:
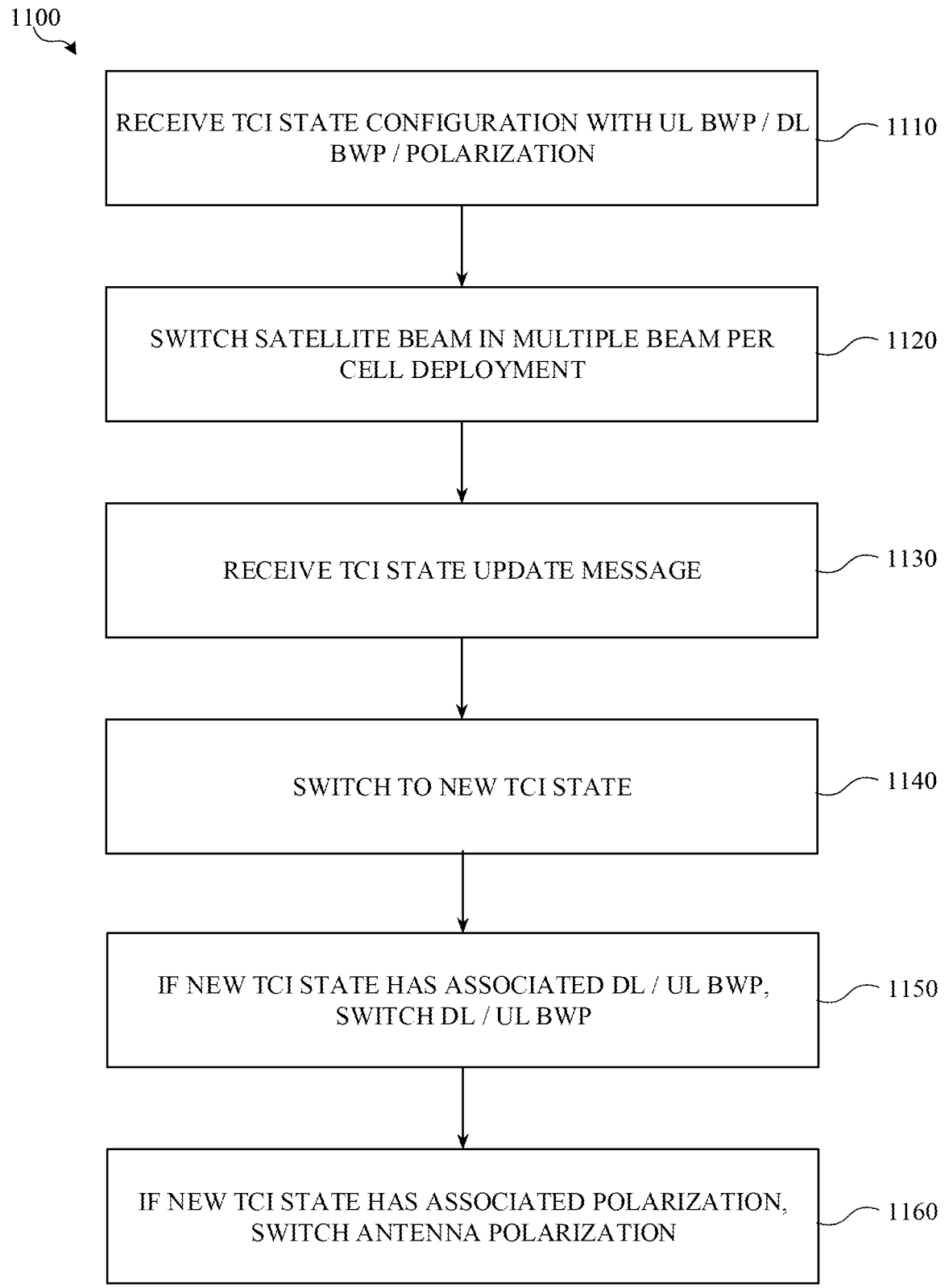
FIG. 11 illustrate an example process flow for implicit bandwidth part (BWP) with beam switching, in connection with aspects discussed herein.

Referring to FIG. 11, illustrated is an example process flow 1100 for performing an implicit BWP switching based on satellite beam switching configuration information. The process flow 1100 initiates at 1110 where the UE 110, for example, can receive the TCI state update info from a MAC CE or DCI to implement switching to the new TCI state for a new beam.

At 1120, the UE 1120 can be triggered to switch beams in a multiple beam per cell deployment scenario.

At 1130, the UE 110 can receive a TCI update message, which can include the configuration 1000 as a DCI or MAC CE.

At 1140, the UE 110 switching to a new TCI state as a corresponding new beam in beam switching.

At 1150, then in the new TCI state with the associated BWP for UL and DL from the TCI configuration/update message, the UE 110 can also switch the BWP accordingly after switching the beam.

At 1160, if the beam switching is also associated with the polarization, the UE will also switch that with the beam switching.

In an aspect, in a TCI update a MAC CE activation timing can be configured by the UE in considering the BWP switching delay. For example, if the MAC CE of "Indication of TCI state for UE-specific PDCCH" or "Activation/deactivation of UE-specific PDSCH TCI state" is received, then the TCI state update includes both beam switching and BWP switching. A BWP switching delay can be configured in these operations in determining the MAC CE activation timing. With just beam switching, the activation time could be shorter, but when considered with the BWP switching or polarization switching an increase in an activation timing for the TCI update MAC CE is configured so that a BWP switching delay is configured into the BWP switching operations associated with the beam switching configuration or TCI state update. In other words, upon receiving a TCI state update information from a MAC CE, the UE 110 is configured to modify the TCI state of a beam based on a MAC CE activation timing that includes a BWP switching delay to prolong a duration of the beam switching.

Figure 12:
FIG. 12 illustrates an example BWP configuration for beam switching and BWP switching in NTN operations, in connection with aspects discussed herein.

Referring to FIG. 12, illustrated is an example BWP configuration 1200 in accord with various aspects. The BWP configuration 1200 is configured to implicitly enable satellite beam switching with BWP switching, so that the BWP switching is triggered with data for the BWP such as location and bandwidth and a BWP spacing or ID. Additionally, the BWP configuration 1200 includes different satellite beams identified to the BWP identified. In this configuration, the UE 110 can perform beam switching based on the BWP switching, after BWP switching is performed. As such, BWP switching can be directly triggered/enabled, while the UE 110 can operate to perform beam switching autonomously based on the BWP configuration information.

In an example, the BWP configuration information can include a "TCI states ID" field or other field, which has the corresponding beam switching information. With this configuration, once the UE 110 gets the indication about the BWP switching it can also perform the beam switching accordingly. In response to the BWP being associated with a different satellite beam, the UE 110 can perform beam switching to the different satellite beam based on the BWP configuration information. The BWP configuration 1200 can comprise a sequence of a TCI state ID to indicate the BWP being associated with the associated satellite.

Figure 13:
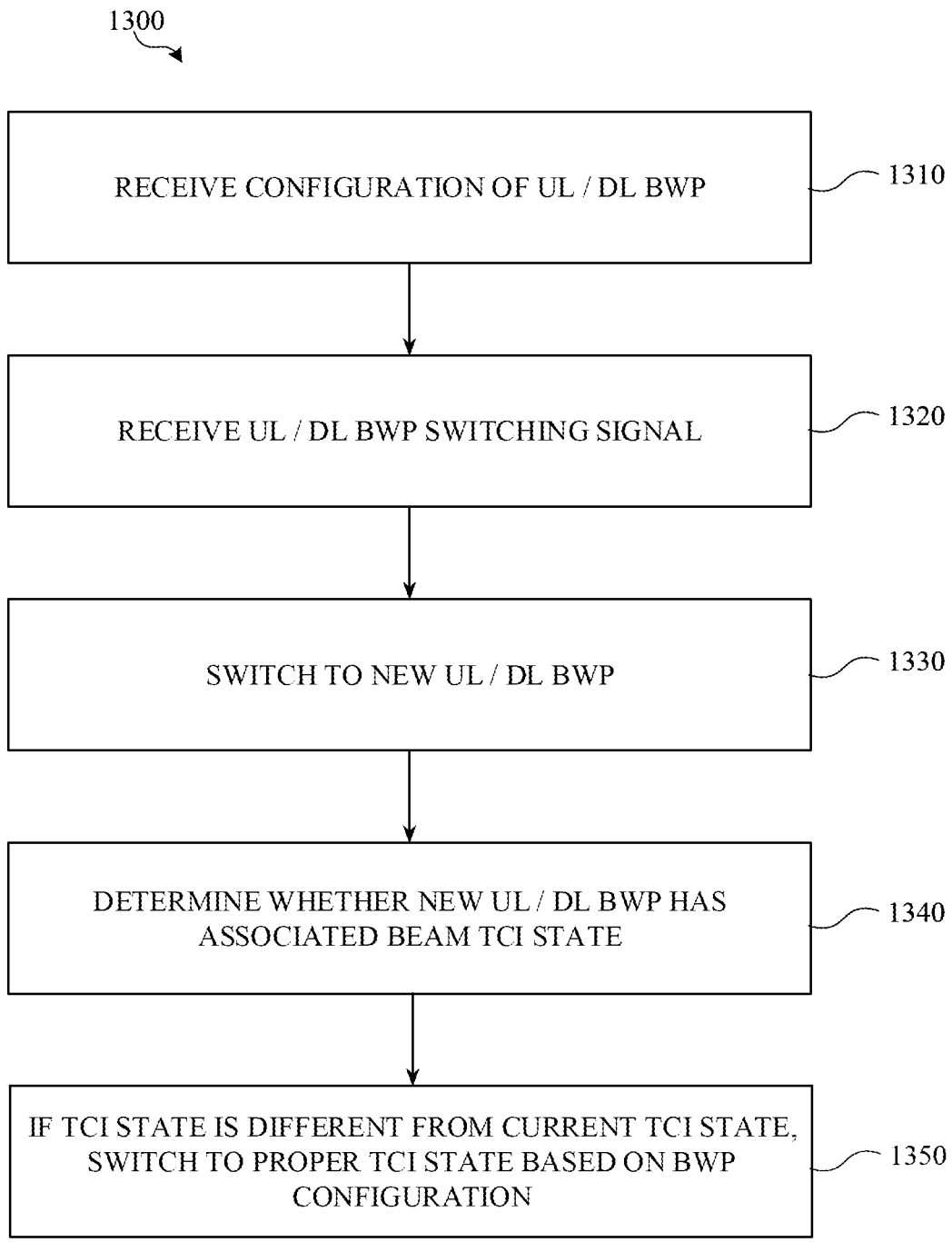
FIG. 13 illustrates an example process flow for implicit beam switching with BWP switching, in connection with aspects discussed herein.

Referring to FIG. 13, illustrated is an example process flow 1300 for beam switching according to BWP configuration as an implicit beam switching with BWP switching. The process flow 1300 initiates at 1310 where UE 110 receives an update of a new BWP configuration for UL or DL BWP and the update can include the beam switching information.

At 1320, the UE 110 can receive a DL/UL BWP switching signal to trigger BWP switching.

At 1330, after the UE receives the BWP switching signal (e.g., in DCI 1_1 or 0_1), the UE 110 can switch to the new BWP.

At 1340, the UE 110 determines whether the new BWP has an associated beam TCI state, and at 1350, if the TCI state is different from a current TCI state, the UE 110 can also switch the TCI state for the new beam based thereon. In the DCI with "BWP indicator", the corresponding "Transmission configuration indication" field can indicate which of the TCI states associated with the BWP configuration is selected. For example, a BWP configuration has the associated TCI state ID={2, 3, 4, 6}, then the 2-bit "Transmission configuration indication" field indicates the proper TCI state.

In an aspect, the minimum time for the BWP switching can increase because it also includes the beam switching. A minimum time gap between the DCI and PDSCH/PUSCH can be configured to be increased in order to enlarge a time offset for the beam switching delay. In other words, upon receiving a BWP configuration information in DCI, the UE 110 is configured to modify the BWP switching based on a BWP switching delay to prolong a duration of the BWP switching, for example, to enlarge a time gap between the DCI and a PUSCH or PDSCH.

Alternatively, or additionally, in BWP switching there is no default BWP because the satellite is moving. The BWP is typically associated with the beam. Thus, the UE 110 can operate to disassociate the timer based BWP switching in the NTN, or set the timer to infinite to prolong a gap for a beam switching delay.

Figure 14:
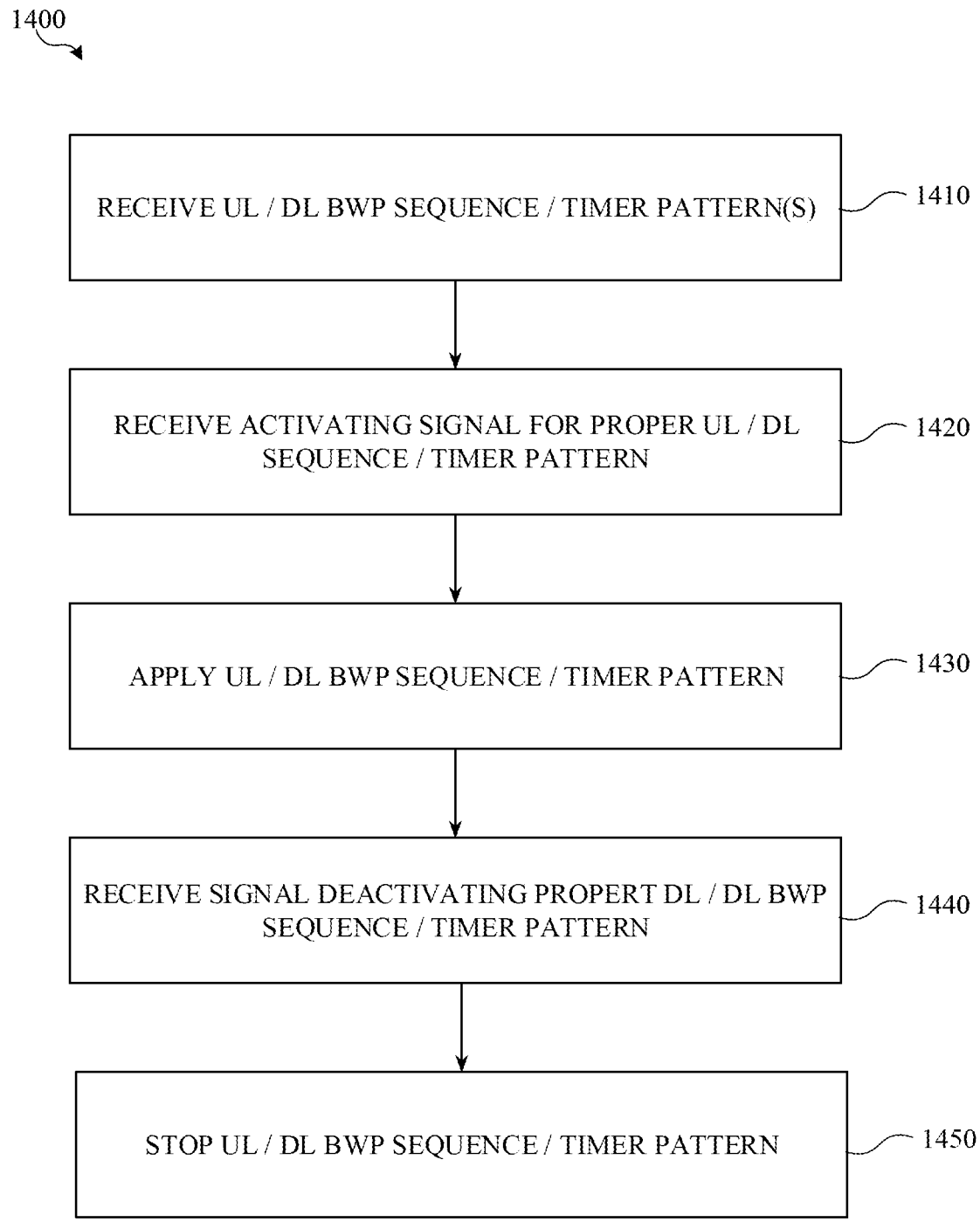
FIG. 14 illustrates an example process flow for timer-based BWP switching, in connection with aspects discussed herein.

Referring to FIG. 14, illustrated is an example process flow 1400 for a timer based BWP switching. At 1410, the process flow 1400 initiates with receiving a configuration of a UL/DL BWP sequence/timer patterns. Here, the process flow 1400 can be operable for earth moving beams. If the satellite 160 is moving its coverage area also moving, while the UE 110 could be at a location where even though the UE is not moving it will still have to switch to the next beam of BWP because satellite 160 is moving. Thus, a UL/DL BWP sequence/timer pattern can be configured to trigger the UE 110 to advanced BWP switching.

At 1420, the process flow comprises receiving a signal for activating a proper UL or DL BWP sequence/timer pattern via a DCI or a MAC CE, for example.

At 1430, the process flow includes applying the UL/DL BWP sequence/timer pattern based on the activating signal. The UE 110 could select, or the signal could trigger the particular pattern to be applied. The process flow 1400 can be dependent on the ephemeris or the movement of the satellite. Based on the pattern, the UE 110 will switch the beam of BWP after a certain time because the satellite is moving. Thus, instead of the indication based BWP switching, a timer based BWP switching can be utilized so that after some time the UE 110 performs the BWP switching autonomously.

A sequence of BWPs and the associated timer for each BWP may be configured. For example, BWP ID sequence (1, 2, 3, 1, 2, 3, 1, 3) with corresponding timer (100, 100, 100, 150, 120, 140, 110, 150) seconds can be configured. The BWP can be applied as BWP ID=1 for 100 seconds, for example, and apply BWP ID=2 for 100 seconds, etc., based on the pattern selected. Multiple BWP sequence/timer patterns may be configured via RRC. A MAC CE or DCI can be configured to indicate which of the BWP sequence/timer pattern is to be used. Here, the UL BWP sequence/timer and DL BWP sequence/timer can be configured separately and independently, or together.

At 1440, the UE 110 can receive a signaling that deactivates the UL/DL BWP sequence/timer pattern (e.g., via DCI, MAC CE, or higher layer signaling). At 1450, the UE 110 stops the UL DL BWP sequence/timer pattern based on the deactivation signal.

In an aspect, the UE 110 can further operate a group common DCI BWP switching, especially for the earth moving beam. Thus, if the satellite 160 has moved then the UE 110 on the ground will switch BWP while all the UEs in the same area are switching from one BWP to another one. The common DCI can be applicable to all the UEs in a certain location. To support such a common DCI configuration, a new RNTI called the BWP RNTI can be used for the group of UEs in certain location. This BWP RNTI can be configured by RRC signaling for all the UEs in a certain location, in which the UE 110 can receive this group common DCI that is scrambled by the BWP RNTI. The UE 110 decodes the common DCI based on the BWP RNTI and performs the UL/DL BWP switching as indicated.

While the methods are illustrated and described above as a series of acts or events, it will be appreciated that the illustrated ordering of such acts or events are not to be interpreted in a limiting sense. For example, some acts can occur in different orders or concurrently with other acts or events apart from those illustrated or described herein. In addition, not all illustrated acts can be required to implement one or more aspects or examples of the disclosure herein.

Also, one or more of the acts depicted herein can be carried out in one or more separate acts or phases. In some examples, the methods illustrated above can be implemented in a computer readable medium using instructions stored in a memory. Many other examples and variations are possible within the scope of the claimed disclosure.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is a baseband processor, configured to: transmit a beam failure recovery request (BFRQ) in response to a detection of a beam failure on a non-terrestrial network (NTN); and receive a beam failure recovery response (BFRR) via a physical downlink control channel (PDCCH) based on at least four slots after the BFRQ and a time offset.

A second example can include the first example, wherein the time offset comprises at least one of: a K offset comprising a UE specific offset or a beam specific offset, or a K mac, based on whether a timing reference point is located at a base station of the NTN in a primary cell (PCell) or a primary secondary cell group cell (PSCell), wherein the beam specific offset corresponds to a current beam or another beam with a different beam index, and wherein the K mac comprises another time offset corresponding to a medium access control (MAC) control element (MAC CE) activation time for a downlink configuration.

A third example can include the first or second example, wherein the time offset is based on a random access response (RAR) window offset derived from a minimum round trip time (RTT) of a cell for the NTN, or wherein the time offset is based on a maximum RTT of the cell that is broadcast for an initial access.

A fourth example can include any one or more of the first through third examples, wherein the time offset comprises at least one of: a K offset that is a cell specific timing offset or a beam specific offset, based on a maximum RTT broadcast from a network for an initial access, or a K mac that comprises another time offset corresponding to a MAC CE activation time for a downlink configuration, wherein the beam specific offset corresponds to a current beam or another beam of a beam switching operation.

A fifth example can include any one or more of the first through fourth examples, wherein the processor is further configured to: transmit the BFRQ in a first uplink (UL) transmission via a beam identified from a beam switching operation; receive a downlink control information (DCI) via a physical downlink control channel (PDCCH); and transmit a physical uplink control channel (PUCCH) on the beam based on a beam failure recovery activation timing that comprises a gap of at least twenty-eight symbols and the time offset.

A sixth example can include any one or more of the first through fifth examples, wherein the first UL transmission comprises a physical random channel (PRACH) for a PCell or a PSCell of the NTN, or comprises a PUSCH carrying a MACE CE for a secondary cell (SCell) of the NTN, and wherein the processor is further configured to: monitor control resource sets (CORESETS) of the PDCCH based on the twenty-eight symbols and the time offset of the gap.

A seventh example can include any one or more of the first through sixth examples, wherein the processor is further configured to: in response to receiving a zero value for a search space ID in a downlink control signaling, monitor PDCCH candidates at monitoring occasions associated with a synchronization signal (SS)/Physical Broadcast Channel (PBCH) based on the time offset after a random access procedure that is not initiated by a PDCCH order triggering a contention-free random access procedure; and reset a beam of a CORESET of index zero after transmitting a PRACH for the random access procedure that is not initiated by the PDCCH order triggering the contention-free random access procedure.

An eighth example can include any one or more of the first through seventh examples, wherein the processor is further configured to: transmit the BFRQ in a PRACH; and monitor a downlink (DL) channel for a RAR after a last symbol of a PRACH occasion for transmitting the PRACH based on a RAR window offset that comprises a K mac derived from a drifting rate in the NTN and at least one of: a timing advance (TA) or a K offset that is broadcasted for an initial access.

A ninth example can include any one or more of the first through eighth examples, wherein the processor is further configured to: transmit an UL message comprising a random access message 3 for a random access procedure in the NTN; and monitor a reception of a contention resolution message 4 in response to the RAR message 3 based on a contention resolution timer (CRtimer) and a K mac derived from a drifting rate in the NTN and at least one of: a timing advance (TA) or a K offset that is broadcasted for an initial access.

A tenth example can include any one or more of the first through ninth examples, wherein the time offset comprises a cell specific, a beam specific or a UE specific K offset that is received via a radio resource control (RRC) message, a MAC CE, or a DCI, and comprises a differential between a previous K offset and an updated K offset.

An eleventh example can include any one or more of the first through tenth examples, wherein the processor is further configured to: receive a DCI format 0_0 or 1_0 comprising an indication that a hybrid automatic repeat request (HARQ) process number is increased over sixteen or up to thirty-two for the NTN band or a DCI cyclic redundancy check (CRC) scrambled by a cell (C) radio network temporary identifier (C-RNTI), a configured scheduling (CS)-RNTI, a modulation coding scheme (MCS)-C-RNTI or a temporary cell (TC)-RNTI.

An twelfth example can include any one or more of the first through eleventh examples, wherein the processor is further configured to: generate a beam switching from a first beam to a second beam based on configuration information associated with beam switching, wherein the configuration information comprises a Quasi Co-Location (QCL) configuration information that comprises at least one of: an associated DL BWP, an associated UL BWP, or an associated polarization; modify a transmission configuration indication (TCI) state of the first beam or the second beam based on the at least one of: the associated DL BWP, the associated UL BWP, or the associated polarization; and generate a bandwidth part (BWP) switching based on the QCL configuration information used in the beam switching in response to a frequency reuse factor being greater than one.

A thirteenth example can include any one or more of the first through twelfth examples, wherein the processor is further configured to: receive TCI state update information from a MAC CE to modify the TCI state of the first beam or the second beam based on a MAC CE activation timing that includes a BWP switching delay to prolong a duration of the beam switching.

A fourteenth example can include any one or more of the first through thirteenth examples, wherein the processor is further configured to: receive a DCI for switching a BWP, wherein the DCI comprises a BWP configuration information that indicates associated satellite beams; and in response to the BWP being associated with a different satellite beam, perform beam switching to the different satellite beam based on the BWP configuration information, wherein the BWP configuration comprises a sequence of a TCI state ID to indicate the BWP being associated with the associated satellite beams.

A fifteenth example can include any one or more of the first through fourteenth examples, wherein the processor is further configured to: disable a timer-based BWP switching in a BWP switching of the NTN to prolong a duration of the beam switching.

A sixteenth example can include any one or more of the first through fifteenth examples, wherein the processor is further configured to: configure a timer based BWP switching in the NTN based on a sequence of BWPs and one or more timers associated with a BWP of the sequence of BWPs.

A seventeenth example can include any one or more of the first through sixteenth examples, wherein the processor is further configured to: receive one or more BWP sequence/timer patterns via an RRC signaling, a MAC CE or a DCI; and configure, separately or jointly, an UL BWP sequence/timer and a DL BWP sequence/timer based on the one or more BWP sequence/timer patterns.

An eighteenth example can include any one or more of the first through seventeenth examples, wherein the processor is further configured to: receive a group common DCI that indicates a BWP switch to perform a BWP switching within an area, wherein the group common DCI is based on a BWP radio network temporary identifier (BWP-RNTI).

A nineteenth example can be a user equipment (UE), comprising: a memory; and a processor configured to: transmit a beam failure recovery request (BFRQ) in an uplink (UL) transmission slot on a non-terrestrial network (NTN); and monitor a physical downlink control channel (PDCCH) in a search space set for a beam forming recovery response (BFRR) based on at least four slots after the UL transmission slot and a time offset.

A twentieth example can include the nineteenth example, wherein the time offset comprises at least one of: a K offset, a K mac, or a random access response (RAR) window offset configured by a beam failure recovery configuration, based on a location of a timing reference point between a base station or other timing reference point of the NTN in a primary cell (PCell) or a primary secondary cell group cell (PSCell).

A twenty-first example can include any one or more of the nineteenth through twentieth examples, wherein the K mac comprises another time offset corresponding to a medium access control (MAC) control element (MAC CE) activation time for a downlink configuration, wherein the K offset comprises a UE specific offset, a beam specific offset, or a cell specific offset of the NTN based on a round trip time (RTT), and wherein the RAR window offset is based on a minimum RTT of a cell of the NTN.

A twenty-second example can include any one or more of the nineteenth through twenty-first examples, wherein the processor is further configured to: receive a downlink control information (DCI) via a physical downlink control channel (PDCCH); and transmit a physical uplink control channel (PUCCH) based on a beam failure recovery activation timing with a gap of at least twenty-eight symbols and the time offset after the PDCCH in the search space set.

A twenty-third example can include any one or more of the nineteenth through twenty-second examples, wherein the processor is further configured to: monitor a DL channel for a random access response (RAR) after a last symbol of a PRACH occasion for transmitting the PRACH based on a RAR window offset that comprises a K mac derived from a drifting rate in the NTN and at least one of: a timing advance (TA) or a K offset that is broadcasted for an initial access, wherein the RAR window offset is based on a UE specific RTT between the UE and a base station, or a maximum RTT of a cell of the NTN, and wherein the TA is based on a first timing advance based on a GNSS location of the UE and a satellite ephemeris of the NTN, a second time between the satellite and a reference point, another common drifting rate broadcast by the NTN, and a time gap between a last reception time and a current time.

A twenty-fourth example can include any one or more of the nineteenth through twenty-third examples, wherein the processor is further configured to: perform a bandwidth part (BWP) switching based on Quasi Co-Location (QCL) configuration information for beam switching in response to a frequency reuse factor being greater than 1 and the configuration information including at least one of: an UL BWP, a downlink (DL), or a polarization; or perform the beam switching in response to a BWP configuration information indicating a transmission configuration indication (TCI) state ID of a BWP associated with one or more associated DL satellite beams, and increasing a minimum time gap for the BWP switching.

A twenty-fifth example can include any one or more of the nineteenth through twenty-fourth examples, wherein the processor is further configured to: modify a TCI state of a satellite beam based on a MAC CE activation timing comprising a BWP switching delay to prolong a duration of the beam switching.

A twenty-sixth example can be a base station, comprising: a memory; and a processor configured to: receive a beam failure recovery request (BFRQ) in an uplink (UL) transmission slot on a non-terrestrial network (NTN); and transmit a beam failure recovery response (BFRR) in a beam via a physical downlink control channel (PDCCH) based on at least four slots and a time offset after the BFRQ of the UL transmission slot.

A twenty-seventh example can include the twenty-sixth example, wherein the time offset comprises: a K offset, a Kmac or a random access response (RAR) window offset in a window configured by a beam failure recovery configuration, wherein the K offset is utilized in response to a timing reference point being located at a base station and comprises UE specific, a UE specific offset, a beam specific offset, or a cell specific offset of the NTN, wherein the Kmac offset comprises a time offset for a media access control (MAC) control element (MAC CE) activation time for a downlink (DL) configuration and associated with a timing advance between a UE, or the base station, and a timing reference point of the NTN, and wherein the RAR window offset comprises a minimum round trip delay (RTT) of a cell of the NTN.

A twenty-eighth example can include any one or more of the twenty-sixth through twenty-seventh examples, wherein the processor is further configured to: receive a physical uplink control channel (PUCCH) based on a beam failure recovery activation timing in the beam of the transmitted BFRR, wherein the beam failure recovery activation timing is derived from at least twenty-eight symbols plus the time offset for using a receiver beam based on a beam switching that matches a transmit beam of a user equipment (UE).

A twenty-ninth example can include any one or more of the twenty-sixth through twenty-eighth examples, wherein the processor is further configured to: transmit the PDCCH for a Type-1-PDCCH common search space (CSS) at least the time offset after a last symbol of a physical random access channel (PRACH) occasion corresponding to a PRACH transmission, wherein the time offset comprises at least one of: a K mac derived from a drifting rate in the NTN and at least one of: a timing advance (TA) or a K offset that is broadcasted for an initial access.

A thirtieth example can include any one or more of the twenty-sixth through twenty-ninth examples, wherein the processor is further configured to: transmit a DCI format 0_0 or 1_0 for the NTN comprising an indication that a hybrid automatic repeat request (HARQ) process number has been increased over sixteen or up to thirty-two for an NTN band or a DCI cyclic redundancy check (CRC) scrambled by a cell (C) radio network temporary identifier (C-RNTI), a configured scheduling (CS)-RNTI, a modulation coding scheme (MCS)-C-RNTI or a temporary cell (TC)-RNTI.

A thirty-first example can include any one or more of the twenty-sixth through thirtieth examples, wherein the processor is further configured to: transmit a Quasi Co-Location (QCL) configuration information that comprises a transmission configuration indication (TCI) state of the beam and at least one of: an associated DL BWP, an associated UL BWP, or an associated polarization to enable a bandwidth part (BWP) switching together with a beam switching based on the QCL configuration information in response to a frequency reuse factor being greater than one.

A thirty-second example can include any one or more of the twenty-sixth through thirty-first examples, wherein the processor is further configured to: transmit a DCI to enable a BWP switching together with a beam switching, wherein the DCI comprises a BWP configuration information that indicates satellite beams associated with a BWP indicated by the BWP configuration information.

A thirty-third example can include any one or more of the twenty-sixth through thirty-second examples, wherein the processor is further configured to: transmit one or more BWP sequence/timer patterns to enable a configuration of at least one of: an UL BWP sequence/timer or a DL BWP sequence/timer based on the one or more BWP sequence/timer patterns to trigger a BWP switching independently in advance of a moving satellite ephemeris.

A thirty-fourth example can include any one or more of the twenty-sixth through thirty-third examples, wherein the processor is further configured to: configure a group common DCI to trigger a BWP switch to perform a BWP switching within an area, wherein the group common DCI is based on a BWP radio network temporary identifier (BWP-RNTI).

A thirty-fifth example can be a UE, comprising: a memory; and a processor configured to: generate a beam switching from a first beam to a second beam based on configuration information associated with beam switching, wherein the configuration information comprises a Quasi Co-Location (QCL) configuration information that comprises at least one of: an associated DL BWP, an associated UL BWP, or an associated polarization; modify a transmission configuration indication (TCI) state of the first beam or the second beam based on the at least one of: the associated DL BWP, the associated UL BWP, or the associated polarization; and generate a bandwidth part (BWP) switching based on the QCL configuration information used in the beam switching in response to a frequency reuse factor being greater than one.

A thirty-sixth example can include the thirty-fifth example, wherein the processor is further configured to: receive TCI state update information from a MAC CE to modify the TCI state of the first beam or the second beam based on a MAC CE activation timing that includes a BWP switching delay to prolong a duration of the beam switching.

A thirty-seventh example can include any one or more of the thirty-fifth through thirty-sixth examples, wherein the processor is further configured to: receive a DCI for switching a BWP, wherein the DCI comprises a BWP configuration information that indicates associated satellite beams; and in response to the BWP being associated with a different satellite beam, perform beam switching to the different satellite beam based on the BWP configuration information, wherein the BWP configuration comprises a sequence of a TCI state ID to indicate the BWP being associated with the associated satellite beams.

A thirty-eighth example can include any one or more of the thirty-fifth through thirty-seventh examples, wherein the processor is further configured to transmit a beam failure recovery request (BFRQ) in an uplink (UL) transmission slot on a non-terrestrial network (NTN); and monitor a physical downlink control channel (PDCCH) in a search space set for a beam forming recovery response (BFRR) based on at least four slots after the UL transmission slot and a time offset, wherein the time offset comprises at least one of: a K offset, a K mac, or a random access response (RAR) window offset configured by a beam failure recovery configuration, based on a location of a timing reference point between a base station or other timing reference point of the NTN in a primary cell (PCell) or a primary secondary cell group cell (PSCell).

A thirty-ninth example can include an apparatus comprising a method or means for executing any of the described operations of the first example through the thirty-eighth example.

A fortieth example can include a machine readable medium that stores instructions for execution by a processor to perform any of the described operations of the first example through the thirty-eighth example.

A forty-first example can include a baseband processor comprising: a memory interface; and processing circuitry configured to: perform any of the described operations of the first example through the thirty-eighth example.

A forty-second example can include a User Equipment (UE) configured to execute any of the described operations of the first example through the thirty-eighth example.

A method that includes any action or combination of actions as substantially described herein in the Detailed Description.

A method as substantially described herein with reference to each or any combination of the Figures included herein or with reference to each or any combination of paragraphs in the Detailed Description.

A user equipment configured to perform any action or combination of actions as substantially described herein in the Detailed Description as included in the user equipment.

A network node configured to perform any action or combination of actions as substantially described herein in the Detailed Description as included in the network node.

A non-volatile computer-readable medium that stores instructions that, when executed, cause the performance of any action or combination of actions as substantially described herein in the Detailed Description.

Moreover, various aspects or features described herein can be implemented as a method, apparatus, or article of manufacture using standard programming or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices or other machine-readable media for storing information. The term "machine-readable medium" can include, without being limited to, wireless channels and various other media capable of storing, containing, or carrying instruction(s) or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes or actions of a method or algorithm can reside as one or any combination or set of codes or instructions on a machine-readable medium or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A baseband processor, comprising:
a processor, with memory, configured to:
generate for transmission a beam failure recovery request (BFRQ) in response to a detection of a beam failure on a non-terrestrial network (NTN); and
receive a beam failure recovery response (BFRR) via a physical downlink control channel (PDCCH) based on monitoring the PDCCH beginning at least four slots after the BFRQ plus a time offset.

2. The baseband processor of claim 1, wherein the time offset comprises at least one of: a K offset comprising a UE specific offset or a beam specific offset, or a K mac, based on whether a timing reference point is located at a base station of the NTN in a primary cell (PCell) or a primary secondary cell group cell (PSCell), wherein the beam specific offset corresponds to a current beam or another beam with a different beam index, and wherein the K mac comprises another time offset corresponding to a medium access control (MAC) control element (MAC CE) activation time for a downlink configuration.

3. The baseband processor of claim 1, wherein the time offset is based on a random access response (RAR) window offset derived from a minimum round trip time (RTT) of a cell for the NTN, or wherein the time offset is based on a maximum RTT of the cell that is broadcast for an initial access.

4. The baseband processor of claim 1, wherein the time offset comprises at least one of: a K offset that is a cell specific timing offset or a beam specific offset, based on a maximum round trip time (RTT) broadcast from a network for an initial access, or a K mac that comprises another time offset corresponding to a medium access control (MAC) control element (MAC CE) activation time for a downlink configuration, wherein the beam specific offset corresponds to a current beam or another beam of a beam switching operation.

5. The baseband processor of claim 1, wherein the processor is further configured to:
generate the BFRQ for a first uplink (UL) transmission via a beam identified from a beam switching operation;
receive a downlink control information (DCI) via a physical downlink control channel (PDCCH); and
generate for transmission a physical uplink control channel (PUCCH) on the beam based on a beam failure recovery activation timing that comprises a gap of at least twenty-eight symbols and the time offset.

6. The baseband processor of claim 5, wherein the first UL transmission comprises a physical random channel (PRACH) for a primary cell (PCell) or a primary secondary cell (PSCell) of the NTN, or comprises a physical uplink shared channel (PUSCH) carrying a medium access controL (MAC) control element (MAC CE) for a secondary cell (SCell) of the NTN, and wherein the processor is further configured to: monitor control resource sets (CORESETS) of the PDCCH based on the twenty-eight symbols and the time offset of the gap.

7. The baseband processor of claim 1, wherein the processor is further configured to:
in response to receiving a zero value for a search space ID in a downlink control signaling, monitor PDCCH candidates at monitoring occasions associated with a synchronization signal (SS)/Physical Broadcast Channel (PBCH) based on the time offset after a random access procedure that is not initiated by a PDCCH order triggering a contention-free random access procedure; and
reset a beam of a control resource set (CORESET) of index zero after transmitting a PRACH for the random access procedure that is not initiated by the PDCCH order triggering the contention-free random access procedure.

8. The baseband processor of claim 1, wherein the processor is further configured to:
generate the BFRQ for transmission in a PRACH; and
monitor a downlink (DL) channel for a RAR after a last symbol of a physical random access channel (PRACH) occasion for transmitting the PRACH based on a random access response (RAR) window offset that comprises a K mac derived from a drifting rate in the NTN and at least one of: a timing advance (TA) or a K offset that is broadcasted for an initial access.

9. The baseband processor of claim 1, wherein the processor is further configured to:
generate for transmission an UL message comprising a random access response (RAR) message 3 for a random access procedure in the NTN; and
monitor a reception of a contention resolution message 4 in response to the RAR message 3 based on a contention resolution timer (CRtimer) and a K mac derived from a drifting rate in the NTN and at least one of: a timing advance (TA) or a K offset that is broadcasted for an initial access.

10. The baseband processor of claim 1, wherein the time offset comprises a cell specific, a beam specific or a UE specific K offset that is received via a radio resource control (RRC) message, a MAC CE, or a DCI, and comprises a differential between a previous K offset and an updated K offset.

11. The baseband processor of claim 1, wherein the processor is further configured to:
receive a downlink control information (DCI) format 0_0 or 1_0 comprising an indication that a hybrid automatic repeat request (HARQ) process number is increased over sixteen or up to thirty-two for an NTN band or a DCI cyclic redundancy check (CRC) scrambled by a cell (C) radio network temporary identifier (C-RNTI), a configured scheduling (CS)-RNTI, a modulation coding scheme (MCS)-C-RNTI or a temporary cell (TC)-RNTI.

12. The baseband processor of claim 1, wherein the processor is-further configured to:
generate a beam switching from a first beam to a second beam based on configuration information associated with beam switching, wherein the configuration information comprises a Quasi Co-Location (QCL) configuration information that comprises at least one of: an associated downlink (DL) bandwidth part (BWP), an associated uplink (UL) BWP, or an associated polarization;
modify a transmission configuration indication (TCI) state of the first beam or the second beam based on the at least one of: the associated DL BWP, the associated UL BWP, or the associated polarization; and
generate a bandwidth part (BWP) switching based on the QCL configuration information used in the beam switching in response to a frequency reuse factor being greater than one.

13. The baseband processor of claim 12, wherein the processor is further configured to:
receive transmission configuration indicator (TCI) state update information from a medium access control (MAC) control element (MAC CE) to modify the TCI state of the first beam or the second beam based on a MAC CE activation timing that includes a BWP switching delay to prolong a duration of the beam switching.

14. The baseband processor of claim 12, wherein the processor is further configured to:
receive a downlink control information (DCI) for switching a bandwidth part (BWP), wherein the DCI comprises a BWP configuration information that indicates associated satellite beams; and
in response to the BWP being associated with a different satellite beam, perform beam switching to the different satellite beam based on the BWP configuration information, wherein the BWP configuration comprises a sequence of a TCI state ID to indicate the BWP being associated with the associated satellite beams.

15. The baseband processor of claim 1, wherein the processor is further configured to:
disable a timer-based bandwidth part (BWP) switching in a BWP switching of the NTN to prolong a duration of beam switching.

16. The baseband processor of claim 1, wherein the processor is further configured to:
configure a timer based bandwidth part (BWP) switching in the NTN based on a sequence of BWPs and one or more timers associated with a BWP of the sequence of BWPs.

17. The baseband processor of claim 1, wherein the processor is further configured to:
receive one or more bandwidth part (BWP) sequence/timer patterns via a radio resource control (RRC) signaling, a medium access control (MAC) control element (MAC CE), or a downlink control information (DCI); and
configure, separately or jointly, an uplink (UL) BWP sequence/timer and a downlink (DL) BWP sequence/timer based on the one or more BWP sequence/timer patterns.

18. The baseband processor of claim 1, wherein the processor is further configured to:
receive a group common downlink control information (DCI) that indicates a bandwidth part (BWP) switch to perform a BWP switching within an area, wherein the group common DCI is based on a BWP radio network temporary identifier (BWP-RNTI).

19. A user equipment (UE), comprising:
a memory; and
a processor configured to cause the UE to:
transmit a beam failure recovery request (BFRQ) in an uplink (UL) transmission slot on a non-terrestrial network (NTN); and
monitor, beginning at least four slots after the UL transmission slot and a time offset, a physical downlink control channel (PDCCH) in a search space set for a beam failure recovery response (BFRR).

20. The UE of claim 19, wherein the time offset comprises at least one of: a K offset, a K mac, or a random access response (RAR) window offset configured by a beam failure recovery configuration, based on a location of a timing reference point between a base station or other timing reference point of the NTN in a primary cell (PCell) or a primary secondary cell group cell (PSCell).

21. The UE of claim 20, wherein the K mac comprises another time offset corresponding to a medium access control (MAC) control element (MAC CE) activation time for a downlink configuration, wherein the K offset comprises a UE specific offset, a beam specific offset, or a cell specific offset of the NTN based on a round trip time (RTT), and wherein the RAR window offset is based on a minimum RTT of a cell of the NTN.

22. The UE of claim 19, wherein the processor is further configured to cause the UE to:
receive a downlink control information (DCI) via the PDCCH; and
transmit a physical uplink control channel (PUCCH) after the PDCCH in the search space set.

23. The UE of claim 19, wherein the processor is further configured to:
monitor a DL channel for a random access response (RAR) after a last symbol of a physical random access channel (PRACH) occasion for transmitting a PRACH based on a RAR window offset that comprises a K mac derived from a drifting rate in the NTN and at least one of: a timing advance (TA) or a K offset that is broadcasted for an initial access, wherein the RAR window offset is based on a UE specific round trip time (RTT) between the UE and a base station, or a maximum RTT of a cell of the NTN, and wherein the TA is based on a first timing advance based on a GNSS location of the UE and a satellite ephemeris of the NTN, a second time between a satellite and a reference point, another common drifting rate broadcast by the NTN, and a time gap between a last reception time and a current time.

24. The UE of claim 19, wherein the processor is further configured to:
perform a bandwidth part (BWP) switching based on Quasi Co-Location (QCL) configuration information for beam switching in response to a frequency reuse factor being greater than 1 and the configuration information including at least one of: an UL BWP, a downlink (DL), or a polarization; or
perform the beam switching in response to a BWP configuration information indicating a transmission configuration indication (TCI) state ID of a BWP associated with one or more associated DL satellite beams, and increasing a minimum time gap for the BWP switching.

25. The UE of claim 19, wherein the processor is further configured to:
modify a transmission configuration indicator (TCI) state of a satellite beam based on a medium access control (MAC) control element (MAC CE) activation timing comprising a bandwidth part (BWP) switching delay to prolong a duration of beam switching.

26. A base station, comprising:
a memory; and
a processor configured to cause the base station to:
receive a beam failure recovery request (BFRQ) in an uplink (UL) transmission slot on a non-terrestrial network (NTN);
transmit a beam failure recovery response (BFRR) in a beam via a physical downlink control channel (PDCCH); and
receive a physical uplink control channel (PUCCH) based on a beam failure recovery activation timing in the beam of the transmitted BFRR, wherein the beam failure recovery activation timing is derived from at least twenty-eight symbols plus a time offset.

27. The base station of claim 26, wherein the time offset comprises: a K offset, a Kmac or a random access response (RAR) window offset in a window configured by a beam failure recovery configuration, wherein the K offset is utilized in response to a timing reference point being located at the base station and comprises a user equipment (UE) specific offset, a beam specific offset, or a cell specific offset of the NTN, wherein the Kmac offset comprises a time offset for a media access control (MAC) control element (MAC CE) activation time for a downlink (DL) configuration and associated with a timing advance between a UE, or the base station, and a timing reference point of the NTN, and wherein the RAR window offset comprises a minimum round trip delay (RTT) of a cell of the NTN.

28. The base station of claim 26, wherein
the beam failure recovery activation timing is for using a receiver beam based on a beam switching that matches a transmit beam of a user equipment (UE).

29. The base station of claim 26, wherein the processor is further configured to:
generate for transmission the PDCCH for a Type-1-PDCCH common search space (CSS) at least the time offset after a last symbol of a physical random access channel (PRACH) occasion corresponding to a PRACH transmission, wherein the time offset comprises at least one of: a K mac derived from a drifting rate in the NTN and at least one of: a timing advance (TA) or a K offset that is broadcasted for an initial access.

30. The base station of claim 26, wherein the processor is further configured to:
generate for transmission a downlink control information (DCI) format 0_0 or 1_0 for the NTN comprising an indication that a hybrid automatic repeat request (HARQ) process number has been increased over sixteen or up to thirty-two for an NTN band or a DCI cyclic redundancy check (CRC) scrambled by a cell (C) radio network temporary identifier (C-RNTI), a configured scheduling (CS)-RNTI, a modulation coding scheme (MCS)-C-RNTI or a temporary cell (TC)-RNTI.

* * * * *